United States Patent
Konishi

(10) Patent No.: US 7,055,944 B2
(45) Date of Patent: Jun. 6, 2006

(54) RECORDING INK AND MANUFACTURING METHOD THEREOF, INK CARTRIDGE, INK RECORDED MATTER, INKJET RECORDING APPARATUS, AND INKJET RECORDING METHOD

(75) Inventor: Akiko Konishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/002,887

(22) Filed: Dec. 3, 2004

(65) Prior Publication Data

US 2005/0117008 A1    Jun. 2, 2005

Related U.S. Application Data

(63) Continuation of application No. PCT/JP03/07016, filed on Jun. 3, 2003.

(30) Foreign Application Priority Data

Jun. 3, 2002    (JP)    ............................. 2002-162053

(51) Int. Cl.
*B41J 2/01* (2006.01)

(52) U.S. Cl. ........................................ 347/100; 347/95
(58) Field of Classification Search ................ 347/100, 347/95, 96, 101; 106/31.6, 31.27, 31.13; 523/160
See application file for complete search history.

(56) References Cited

U.S. PATENT DOCUMENTS

| | | | | |
|---|---|---|---|---|
| 4,508,570 A | * | 4/1985 | Fujii et al. ................... | 347/100 |
| 5,954,866 A | * | 9/1999 | Ohta et al. ................. | 106/31.89 |
| 6,113,679 A | * | 9/2000 | Adkins et al. ............. | 106/31.6 |
| 6,143,807 A | * | 11/2000 | Lin et al. .................. | 106/31.65 |
| 6,341,856 B1 | * | 1/2002 | Thompson et al. ......... | 347/100 |
| 6,786,586 B1 | * | 9/2004 | Koga et al. .................... | 347/95 |
| 2001/0029870 A1 | * | 10/2001 | Uemura et al. .......... | 106/31.65 |
| 2002/0012035 A1 | | 1/2002 | Mouri et al. | |
| 2003/0038869 A1 | * | 2/2003 | Kaneko et al. ............. | 347/100 |

FOREIGN PATENT DOCUMENTS

| | | | |
|---|---|---|---|
| EP | 1146094 | | 10/2001 |
| EP | 1146094 A2 | * | 10/2001 |
| EP | 1167468 | | 1/2002 |
| JP | 10036733 | * | 2/1998 |
| JP | 2000-53898 | | 2/2000 |
| JP | 2002-88289 | | 3/2002 |
| JP | 2002-97389 | | 4/2002 |
| JP | 2002-121419 | | 4/2002 |
| JP | 2002-121434 | | 4/2002 |
| JP | 2002-121446 | | 4/2002 |
| JP | 2002-121460 | | 4/2002 |
| JP | 2002-241638 | | 4/2002 |
| JP | 2002-146246 | | 5/2002 |
| JP | 2002-146255 | | 5/2002 |

* cited by examiner

*Primary Examiner*—Manish S. Shah
(74) *Attorney, Agent, or Firm*—Oblon, Spivak, McClelland, Maier & Neustadt, P.C.

(57) ABSTRACT

A recording ink, includes: a coloring agent; a surfactant; a penetrant; and a defoaming agent. The recording ink includes $3.0 \times 10^7$ (quantity/5 μl) or less coarse particles each having a particle diameter of 0.5 μm or more, and an amount of a particle having a particle diameter of from 1 μm to under 5 μm in the coarse particles is 1% by number or less.

20 Claims, 4 Drawing Sheets

RECORDING INK AND MANUFACTURING METHOD THEREOF, INK CARTRIDGE, INK RECORDED MATTER, INKJET RECORDING APPARATUS, AND INKJET RECORDING METHOD

CROSS-REFERENCE TO RELATED APPLICATIONS

This is a continuation of Application No. PCT/JP03/07016, filed on Jun. 3, 2003.

BACKGROUND OF THE INVENTION

1. Field of the Invention

The present invention relates to recording ink suitable for recording by an inkjet recording system and a manufacturing method thereof, an ink cartridge, an ink recorded matter, an inkjet recording apparatus, and an inkjet recording method using the recording ink.

2. Description of the Related Art

Recently, an inkjet printer by an inkjet recording system has become popular rapidly, since, for example, the inkjet printer by the inkjet recording system enables printing on plain paper, facilitates colorization, is small and inexpensive, and realizes low running cost. In general, properties required of recording ink used for the inkjet recording system include, for example, an image density, blur and the like to attain a high image quality; solubility stability, storage stability and the like of a coloring agent for attaining reliability; water resistance, light stability and the like to secure storage stability of a recorded image; and quick drying properties of the ink to attain speeding up. Conventionally, various suggestions have been made to satisfy these properties of the recording ink.

As a coloring agent used for the recording ink, dye has been initially a mainstream since the dye has good coloring properties and high reliability. However, recently, pigments such as carbon black have been used for the purpose of providing a recorded image with light stability, water resistance and the like. Further, recently, there is a trend to discharge the recording ink which is broken into small droplets in order to attain a high quality and speeding up of printing. Therefore, a diameter of a nozzle for discharging ink in printers and the like has become smaller. However, it is difficult to stably discharge the recording ink using the pigment by the nozzle with a small diameter. Therefore, many methods of manufacturing recording ink with superior discharge stability have been suggested. For example, a method wherein after recording ink is manufactured, the recording ink is left under unfavorable conditions (for example, for three days at 50° C.) to form agglomeration which is removed by filtration has been suggested (refer to Japanese Patent Application Laid-Open (JP-A) No. 57-190059). In this case, however, there is a problem that manufacturing efficiency of the recording ink is poor, formation properties of the agglomeration vary according to lot-to-lot difference of a raw material, and manufacturing at low cost is not possible.

Therefore, recording ink whose gross volume of particulate matters having a particle diameter of 2 μm or more is from $3.5 \times 10^{-6}$ to $1 \times 10^{-2}$ (cm$^3$/cm$^3$ ink) has been suggested (refer to Japanese Patent (JP-B) No. 3102209). This suggestion is, however, intended to secure discharge stability by destroying and removing air bubbles generated in an ink flow path, and prevent image defect. In this suggestion, there is a problem that it is not possible to inhibit generation of agglomeration after elapsed time and to sufficiently improve storage stability and discharge stability.

Meanwhile, there is a suggestion that, for the purpose of improving storage stability of recording ink, control is made so that particle quantity of pigment particles having a particle diameter of 0.5 μm or more can become $7.5 \times 10^4$ (quantity/μl ink) or less (refer to JP-A No. 11-140356). In this case, however, a range of pigment density is too low. Therefore, there is a problem that it is difficult to perform high speed printing with high resolution, and refining a high density pigment leads to high cost, which is unrealistic.

Further, for the purpose of improving storage stability and an image density of recording ink, recording ink, whose quantity of particles having a particle diameter of 0.5 μm or more is from $6 \times 10^4$ to $6 \times 10^5$ quantity/μl, and whose quantity of particles having a particle diameter of 5 μm or more is 50 quantity/μl or less has been suggested (refer to JP-A No. 2000-204305). In this case, however, the particles include not only pigment agglomeration, but also water polymer agglomeration, and generation of the pigment agglomeration is not controlled.

In a color image, color boundary bleeding and the like have a significant impact on an image quality. Therefore, in order to raise a rate of permeability of recording ink into paper, and improve quick drying properties of the recording ink, many approaches to secure a high image quality by adding various surfactants and penetrants to the recording ink have been suggested. For example, there is a suggestion that a surfactant whose surface tension is from 20 dyne·cm$^{-1}$ to 50 dyne·cm$^{-1}$ at micelle density in water-soluble dye, polyvalent alcohols and water is contained in a recording ink (refer to JP-A No. 55-29546). In this case, apparent drying properties are improved. However, there is a problem that blur becomes significant depending on paper types. Further, there is a suggestion that dialkyl sulfo succinic acid or salt thereof as a surfactant is added to recording ink (refer to Japanese Patent Application Publication (JP-B) No. 60-23793). In this case, however, regarding dioctyl sodium sulfosuccinate, di(2-ethyl hexyl) sodium sulfosuccinate and the like, there is a problem that pixel diameters thereof remarkably vary according to paper types; air bubbles are easily generated when, for example, ink is filled in a cartridge, the cartridge is loaded to a head, the ink is sucked after loading the cartridge, printing is performed, and printing is stopped; and discharge defect is easily caused.

Therefore, there are various suggestions to prevent generation and suck-in of air bubbles. For example, recording ink capable of securing printing stability by improving wet properties to a head and an ink supply system by using ink whose foaming power stability and bubble stability are in a specific range based on JIS K3362-1970, has been suggested (refer to JP-B No. 2707658). In this case, wet properties to a plastic member are improved. However, there is a problem that effects cannot be obtained depending on types of component members of a recording apparatus. Further, recording ink whose bubble stability factor after five minutes is 0 mm (bubble stability factor after one minute is under 5 mm) based on JIS K3362 has been suggested (refer to JP-B No. 07-26049). In this case, however, a material is limited to lower alkyl alcohol having carbon quantity of 5 or less, allowing no versatility. Further, since permeability is low, an image quality in high speed printing is low. Further, recording ink using a specific acetylene glycol surfactant has been suggested (refer to JP-A No. 2000-144026). In this case, however, there is a problem that the specific acetylene glycol surfactant interacts with a coloring agent depending on coloring agent types, and therefore, a drying rate may not be improved. In addition, there is a problem that when a pigment such as carbon black is used, the pigment becomes easy to be agglutinated, and therefore, clogging of a nozzle, turning of ink discharge direction and the like easily arise.

Meanwhile, as a method to improve a drying rate of ink without adding a surfactant, for example, recording ink containing dye and water-soluble glycol ethers has been suggested (refer to JP-A No. 08-113739). Further, an ink composition of matter containing a pigment, glycol ethers such as diethylene glycol mono-n-butyl ether, and water has been suggested (refer to JP-A No. 10-95941). In these cases, however, lots of glycol ethers are to be added in order to improve a drying rate. In result, there are problems that ink gives off a bad smell, safety is not sufficient, and a contact part with the ink becomes deteriorated. Further, carbon black ink containing a specific glycol solvent has been suggested (JP-A No. 07-331142). In this case, however, there is a problem that the carbon black ink containing the specific glycol solvent has insufficient permeability, and an image quality is low. Further, an ink composition of matter containing an organic silicone compound has been suggested (refer to JP-A No. 09-31380). In this case, the ink composition of matter containing the organic silicone compound has defoaming effect. However, the ink composition of matter containing the organic silicone compound has no surfactant and the like, and therefore, there is a problem that its permeability into paper is slow and an image quality is low.

Meanwhile, in order to inhibit foaming properties of ink while securing permeability of ink, there are various suggestions to add a defoaming agent. In general, the defoaming agent has foam inhibiting effect and foam breaking effect. In order to improve the foam inhibiting effect, it is necessary to uniformly disperse the defoaming agent in the ink liquid. Meanwhile, in order to improve foam breaking effect, it is necessary that the defoaming agent exists in the vicinity of a surface of the ink liquid. Therefore, when the defoaming agent is used, it is not easy to actually strike a balance between the foam inhibiting effect and the foam breaking effect. There is a problem that reliability is decreased by insoluble particles added in order to obtain the foam breaking effect.

Therefore, it is a current situation that recording ink, which is suitable for the inkjet recording system, which has superior storage stability, in which discharge stability, particularly discharge stability during continuous discharge or after stopping discharge is improved, and with which a high image quality with little blur can be obtained, and its related art has not been provided yet.

Objects and Advantages

It is an object of the present invention to provide recording ink, which has superior storage stability, in which discharge stability, particularly discharge stability during continuous discharge or after stopping discharge is improved, and with which a high image quality with little blur can be obtained and a manufacturing method thereof, an ink cartridge, an ink recorded matter, an inkjet recording apparatus, and an inkjet recording method using the ink.

SUMMARY OF THE INVENTION

According to a first aspect of the present invention, there is provided a recording ink comprising a coloring agent, a surfactant, a penetrant, and a defoaming agent, wherein the recording ink comprises $3.0 \times 10^7$ (quantity/5 µl) or less coarse particles each having a particle diameter of 0.5 µm or more; and an amount of particles having a particle diameter of from 1 µm to under 5 µm in the coarse particles is 1% by number or less. According to the recording ink, storage stability for a long time is good, discharge stability, particularly discharge defect during continuous discharge and after stopping discharge is prevented, and a high image quality with little blur can be obtained.

According to a second aspect of the present invention, there is provided a method of manufacturing recording ink, wherein a step of preparing an ink liquid in which the ink liquid is prepared by mixing a coloring agent, a surfactant, a penetrant, and a defoaming agent; and a step of adjusting coarse particles in which at least one of centrifugal separation, ultrafiltration, and filtering is performed for the ink liquid, so that the number of coarse particles having a particle diameter of 0.5 µm or more is $3.0 \times 10^7$ (quantity/5 µl) or less, and an amount of particles having a particle diameter of from 1 µm to under 5 µm in the coarse particles is 1% by number or less, are included. In the method of manufacturing recording ink, the coloring agent, the surfactant, the penetrant, and the defoaming agent are mixed to prepare the ink liquid in the step of preparing an ink liquid. In the step of adjusting coarse particles, at least one of the centrifugal separation, the ultrafiltration, and the filtering is performed for the ink liquid, so that the number of the coarse particles having a particle diameter of 0.5 µm or more is $3.0 \times 10^7$ (quantity/5 µl) or less, and an amount of the particles having a particle diameter of from 1 µm to under 5 µm in the coarse particles is 1% by number or less. In result, the recording ink of the present invention is effectively manufactured.

According to a third aspect of the present invention, there is provided an ink cartridge comprising a container which houses therein the recording ink of the present invention. The ink cartridge is suitably used for a printer and the like by an inkjet recording system. When recording is performed by using the ink housed in the ink cartridge, storage stability for a long time is good, discharge stability, particularly discharge defect during continuous discharge or after stopping discharge is improved, and a high image quality with little blur can be obtained.

According to a fourth aspect of the present invention, there is provided an inkjet recording apparatus comprising at least an ink flying unit which forms an image by giving an energy to a recording ink to thereby fly the recording ink. In the inkjet recording apparatus, the ink flying unit forms the image by giving the energy to the recording ink to thereby fly the recording ink. In result, storage stability of the recording ink is maintained well for a long time, discharge stability, particularly discharge defect during continuous discharge or after stopping discharge is improved, and a high image quality with little blur can be obtained.

According to a fifth aspect of the present invention, there is provided an inkjet recording method comprising at least a step of forming an image by giving an impulse to the recording ink of the present invention to thereby fly the recording ink. In the inkjet recording method, the image is formed by energizing the recording ink of the present invention and flying the recording ink in the step of flying ink. In result, storage stability of the recording ink is maintained well for a long time, discharge stability, particularly discharge defect during continuous discharge or after stopping discharge is improved, and a high image quality with little blur can be obtained.

According to a sixth aspect of the present invention, there is provided an inkjet recorded matter, wherein an image is formed on a recording material by using the recording ink of the present invention. In the inkjet recorded matter, a high image quality with little blur is retained on the recording material.

Figure 1:
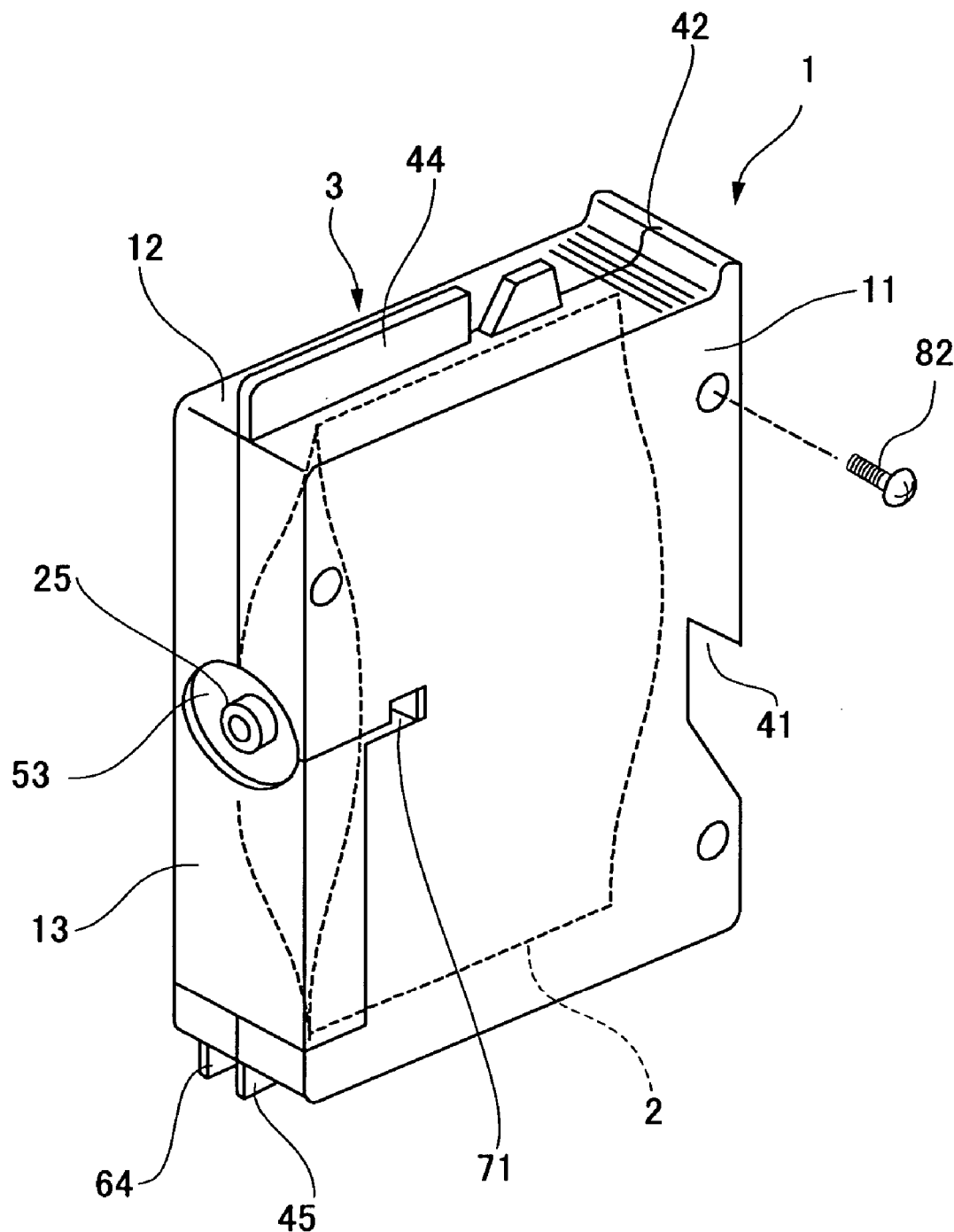
FIG. 1 is an outline explanation drawing showing an example of an ink cartridge of the present invention.

DESCRIPTION OF THE PREFERRED EMBODIMENTS (Recording Ink)

Recording ink of the present invention is recording ink, wherein $3.0 \times 10^7$ (quantity/5 μl) or less coarse particles having a particle diameter of 0.5 μm or more are contained, an amount of particles having a particle diameter from 1 μm to under 5 μm in the coarse particles is 1% by number or less, a coloring agent, a surfactant, a penetrant, and a defoaming agent are contained, and other components such as a wetting agent are contained as necessary.

Coarse Particles

An amount of the coarse particles having a particle diameter of 0.5 μm or more is to be, for example, $3.0 \times 10^7$ (quantity/5 μl) or less, and is more preferably $8.0 \times 10^6$ (quantity/5 μl) or less. The amount is preferably satisfied under normal storage conditions such as room temperature, and is more preferably satisfied under quite inadequate storage conditions such as after being left for 30 days at 50° C.

When the amount of the coarse particles is within the above numerical values, clogging and the like are hard to arise, discharge stability is improved, and a certain degree of coarse particles exists. In result, even when high speed printing and the like are performed with small ink droplets, a sufficient image density can be obtained. A coarse particle having a particle diameter of 5 μm or more is not preferable fundamentally, since such a coarse particle causes nozzle clogging. However, a printer or the like with an inkjet recording system is generally provided with a filter having an average pore diameter of about 5 μm at an ink flow path to a nozzle head in order to prevent mixture of foreign objects coming from an ink cartridge. Therefore, currently, the coarse particle having a particle diameter of 5 μm or more is hard to become a direct cause of the nozzle clogging and the like. Satisfying the amount of the coarse particles not only under the normal storage conditions, but also under the quite inadequate storage conditions is preferable since superior storage stability, discharge stability and the like can be obtained.

An amount of the particles having a particle diameter from 1 μm to under 5 μm in the coarse particles is to be, for example, 1% by number or less, and is preferably from 0.005% by number to 1% by number or less. The amount is preferably satisfied under normal storage conditions such as room temperature, and is more preferably satisfied under quite inadequate storage conditions such as after being left for 30 days at 50° C.

When the amount is within the above numerical values, the quantity of large particles which are easy to become a core of agglomeration is small, and therefore, storage stability is superior. Meanwhile, when the amount is over 1% by number, storage stability for a long time may become significantly deteriorated. Further, satisfying the amount not only under the normal storage conditions, but also under the quite inadequate storage conditions is preferable since superior storage stability, discharge stability and the like can be obtained.

A growth rate of the coarse particles after being left for 30 days at 50° C. is not particularly limited, and can be selected as appropriate according to purposes. However, the growth rate is preferably low. For example, the growth rate is preferably 50% by number or less, and more preferably 40% by number or less, and much more preferably 20% by number or less.

When the growth rate is over 50% by number, storage stability, discharge stability and the like of the recording ink may be insufficient.

Measurement of the coarse particles is not particularly limited, and, for example, can be performed by a method selected as appropriate according to purposes. For example, a particle size distribution measuring apparatus with particle quantity counting system (Particle Sizing Systems Co. make, "AccuSizer 780") or the like can be used.

Coarse particle quantity and particle size distribution in the recording ink can be, for example, controlled and adjusted within a desired range by performing centrifugal separation, filtering, ultrafiltration and the like when the recording ink is manufactured.

Coloring Agent

The coloring agent is not particularly limited, and can be selected as appropriate from known coloring agents according to purposes. For example, examples of the coloring agent include pigments, dye, and polymer fine particles containing the pigment or the dye.

The foregoing coloring agents can be used independently, or two or more thereof can be used at the same time. Specially, the pigment is preferable since the pigment can provide recording images with light stability and water resistance.

The pigment is not particularly limited, and can be selected as appropriate according to purposes. For example, the pigment can be an inorganic pigment or an organic pigment.

Examples of the inorganic pigment include titanium oxide, iron oxide, calcium carbonate, barium sulfate, aluminum hydroxide, barium yellow, cadmium red, chromium yellow, and carbon black. Specially, the carbon black is preferable. Examples of the carbon black include carbon black manufactured by a known method such as contact method, furnace method, and thermal method.

Examples of the organic pigment include an azo pigment, a polycyclic pigment, a dye chelate, a nitro pigment, a nitroso pigment, and aniline black. Specially, the azo pigment, the polycyclic pigment and the like are more preferable. Examples of the azo pigment include an azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye type chelate and an acid dye type chelate.

Colors of the coloring agents are not particularly limited, and can be selected as appropriate according to purposes. Examples of the colors of the coloring agents include color for black ink and color for colored ink. These colors can be used alone, or two or more thereof can be used at the same time.

Examples of the color for black ink include carbon black (C. I. pigment black 7) such as furnace black, lampblack, acetylene black, and channel black; metals such as copper, iron (C. I. pigment black 11), and titanium oxide; and organic pigments such as aniline black (C. I. pigment black 1).

Examples of the color for colored ink include C. I. pigment yellow: 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 138, 150, 151, 153, and 183; C. I. pigment orange: 5, 13, 16, 17, 36, 43, and 51; C. I. pigment red: 1, 2, 3, 5, 17, 22, 23, 31, 38, 48:2, 48:2 (permanent red 2B (Ca)), 48:3, 48:4, 49:1, 52:2, 53:1, 57:1 (brilliant carmine 6B), 60:1, 63:1, 63:2, 64:1, 81, 83, 88, 101 (red oxide), 104, 105, 106, 108 (cadmium red), 112, 114, 122 (quinacridone magenta), 123, 146, 149, 166, 168, 170, 172, 177, 178, 179, 185, 190, 193, 209, and 219; C. I. pigment violet: 1 (rhodamine lake), 3, 5:1, 16, 19, 23, and 38; C. I. pigment blue: 1, 2, 15 (copper phthalocyanine blue), 15:1, 15:2, 15:3 (copper phthalocyanine blue), 16, 17:1, 56, 60, and 63; and C. I. pigment green: 1, 4, 7, 8, 10, 17, 18, and 36.

When the pigment is used as the coloring agent, the pigment is not particularly limited, and can be selected as appropriate according to purposes. For example, a self dispersion pigment, which has at least one kind of a hydrophilic group and shows at least one of water dispersibility and water solubility under nonexistence of a dispersing agent is preferable.

In this case, in the self dispersion pigment, the hydrophilic group (for example, carboxyl group, sulfone group) exists on the surface and the surface is modified. Therefore, even under the nonexistence of a dispersing agent, the self dispersion pigment can be dispersed into water, and has superior dispersibility and dispersion stability in the recording ink. Further, the recording ink containing the self dispersion pigment has superior storage stability, discharge stability (for example, intermittent discharge stability) and the like, and superior re-dispersibility after drying. Therefore, even when printing is stopped for a long time and ink moisture in the vicinity of a nozzle of a head is evaporated, clogging and the like may not arise. Further, with only simple cleaning, a high quality printing and images can be obtained easily. Furthermore, water resistance of recorded matters after recording can be further improved. Those properties make the recording ink containing the self dispersion pigment advantageous.

The hydrophilic group is not particularly limited, and can be selected as appropriate according to purposes. Examples of the hydrophilic group include polar groups and atom groups, which strongly interact with water. Specifically, —$SO_3H$, —$SO_3M$, —$OSO_3H$, —$OSO_3M$, —COOM, —COOH, —$NR_3X$, —$NH_2$, —OH, —CN and the like can be cited. (however, R represents an alkyl group, M represents an alkali metal or —$NH_4$, and X represents a halogen atom). Specially, in terms of dispersibility stability, water resistance of images after printing and the like, the sulfone group (—$SO_3H$) and the carboxyl group (—COOH) are preferable.

The self dispersion pigment can be manufactured by a method to chemically combine the hydrophilic group (for example, the sulfone group, the carboxyl group) with the surface of the pigment; a method to perform wet oxidation treatment for the pigment by using at least one of hypohalogen acid and a salt thereof and the like.

The self dispersion pigment can be concurrently used with the surfactant, the penetrant and the like, since such a combination allows superior intermittent discharge stability and recording of high quality printing and images by the resultant synergy effect.

The dye is not particularly limited, and can be selected as appropriate according to purposes. Examples of the dye include acid dye, direct dye, basic dye, and reactive dye.

The acid dye is not particularly limited, and can be selected as appropriate according to purposes. Examples of the acid dye include dye known as edible dye. For example, C. I. acid yellow: 17, 23, 42, 44, 79, and 142; C. I. acid red: 1, 8, 13, 14, 18, 26, 27, 35, 37, 42, 52, 82, 87, 89, 92, 97, 106, 111, 114, 115, 134, 186, 249, 254, and 289; C. I. acid blue: 9, 29, 45, 92, and 249; C. I. acid black: 1, 2, 7, 24, 26, and 94; C. I. food yellow: 2, 3, and 4; C. I. food red: 7, 9, and 14; C. I. food black: 1 and 2 and the like can be cited.

Examples of the direct dye include C. I. direct yellow: 1, 12, 24, 26, 33, 44, 50, 120, 132, 142, 144, and 86; C. I. direct red: 1, 4, 9, 13, 17, 20, 28, 31, 39, 80, 81, 83, 89, 225, and 227; C. I. direct orange: 26, 29, 62, and 102; C. I. direct blue: 1, 2, 6, 15, 22, 25, 71, 76, 79, 86, 87, 90, 98, 163, 165, 199, and 202; C. I. direct black: 19, 22, 32, 38, 51, 56, 71, 74, 75, 77, 154, 168, and 171.

Examples of the basic dye include C. I. basic yellow: 1, 2, 11, 13, 14, 15, 19, 21, 23, 24, 25, 28, 29, 32, 36, 40, 41, 45, 49, 51, 53, 63, 465, 67, 70, 73, 77, 87, and 91; C. I. basic red: 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112; C. I. basic blue: 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; and C. I. basic black: 2 and 8.

Examples of the reactive dye include C. I. reactive black: 3, 4, 7, 11, 12, and 17; C. I. reactive yellow: 1, 5, 11, 13, 14, 20, 21, 22, 25, 40, 47, 51, 55, 65, and 67; C. I. reactive red: 1, 14, 17, 25, 26, 32, 37, 44, 46, 55, 60, 66, 74, 79, 96, and 97; and C. I. reactive blue: 1, 2, 7, 14, 15, 23, 32, 35, 38, 41, 63, 80, and 95.

The polymer fine particles are not particularly limited, and can be selected as appropriate according to purposes. For example, polymer fine particles containing a color material, polymer fine particles wherein a color material is attached to the surface of the polymer fine particles and the like are suitable. These polymer fine particles can be used alone or two or more thereof can be used at the same time. It is not necessary that a whole part of the color material is contained in the polymer fine particles, or attached to the surface of the polymer fine particles. It is possible that part of the color material is dispersed in emulsion.

The color material is not particularly limited, and can be selected as appropriate according to purposes. For example, examples of the color material include a water insoluble color material and a water hardly soluble color material. Specifically, the foregoing dye and pigments are suitable. Specially, the pigments are preferable since they provide obtained recorded matters with superior light stability and water resistance.

As a material for the polymer fine particles, for example, vinyl polymer, polyester, polyurethane and the like can be cited. These materials can be used alone, or two or more thereof can be used at the same time. Specially, the vinyl polymer and the polyester are preferable.

The polymer fine particles can be manufactured according to known methods. A manufacturing example thereof is to be hereinafter described. That is, for example, first, inside of a one-liter flask provided with a mechanical stirrer, a thermometer, a nitrogen gas induction pipe, a reflow pipe, and a dropping funnel is sufficiently substituted with nitrogen gas, and then, styrene, acrylic acids, lauryl methacrylate, polyethylene glycol methacrylate, a styrene macromer, and mercaptoethanol are mixed therein, and a temperature is raised up to 65° C. Next, a mixed solution of styrene, acrylic acids, lauryl methacrylate, polyethylene glycol methacrylate, hydroxyl ethylmethacrylate, a styrene macromer, mercaptoethanol, azobis methyl valeronitrile, and methyl ethyl ketone is dropped into the flask in two and a half hours. After the dropping, a mixed solution of azobis methyl valeronitrile and methyl ethyl ketone is dropped into the flask in half an hour. After maturation for one hour at 65° C., azobis methyl valeronitrile is added, and the resultant is matured for one hour. After reaction, methyl ethyl ketone is added into the flask to obtain a polymer solution. Next, the polymer solution (A), C. I. pigment yellow 97, 1 mol/l potassium hydroxide solution, methyl ethyl ketone, and ion exchanged water are sufficiently stirred, and kneaded by using a roll mill. The obtained paste is put in ion exchanged water, and stirred sufficiently. After that, methyl ethyl ketone and water are removed by using an evaporator. In result, a water dispersing element of yellow polymer fine particles can be obtained.

An average particle diameter of the coloring agent is not particularly limited, and can be selected as appropriate according to purposes. For example, the average diameter of the coloring agent is preferably from 10 nm to 200 nm, and more preferably from 50 nm to 150 nm, where a volume cumulative percent is 50%.

When the average particle diameter is under 10 nm, dispersion stability in the ink may be lost, and an image density may be lowered in printing. When the average particle diameter is over 200 nm, fixation of images and the like may be poor, and agglomeration, clogging and the like may easily arise in long-term storage.

The average particle diameter can be measured by, for example, dynamic light scattering method (Doppler scattered light analysis), wherein particles in Brownian motion in the ink is illuminated with laser light, and the particle diameter is obtained by variation of frequency (light frequency) of light returned from the particles (back scattered light).

A content of the coloring agent in the recording ink is not particularly limited, and can be selected as appropriate according to purposes. The content of the coloring agent in the recording ink is preferably from 0.5% by mass to 15% by mass, and more preferably from 5% by mass to 12% by mass.

When the content is under 0.5% by mass, an image may have a low density and no contrast. When the content is over 15% by mass, it is difficult to secure dispersion stability of the coloring agent, and therefore, clogging of a nozzle and the like may easily arise, and reliability may be lowered.

As the coloring agent, a coloring agent which has water dispersibility or water solubility under existence of a dispersing agent, in other words, a coloring agent which shows water dispersibility or water solubility by existence of the dispersing agent is also preferable. This case is advantageous since dispersibility of the coloring agent in the recording ink can be improved by the dispersing agent, high quality printing and images can be obtained, water resistance of the recorded matter after recording can be further improved, and strike-through density and the like can be effectively prevented.

The dispersing agent is not particularly limited. A dispersing agent used in preparing a pigment dispersion liquid and the like are suitable. Examples of the dispersing agent include polyacrylic acid, polymethacrylic acid, an acrylic acid-acrylonitrile copolymer, a vinyl acetate-acrylic acid ester copolymer, an acrylic acid-acrylic acid alkyl ester copolymer, a styrene-acrylic acid copolymer, a styrene-methacrylic acid copolymer, a styrene-acrylic acid-acrylic acid alkyl ester copolymer, a stine methacrylic acid-acrylic acid alkyl ester copolymer, a styrene-α-methyl styrene-acrylic acid copolymer, a styrene-α-methyl styrene-acrylic acid copolymer, an acrylic acid alkyl ester copolymer, a styrene-maleic acid copolymer, a vinyl naphthalene-maleic acid copolymer, a vinyl acetate-ethylene copolymer, a vinyl acetate-fatty acid vinyl ethylene copolymer, a vinyl acetate-maleic acid ester copolymer, a vinyl acetate-crotonic acid copolymer, and a vinyl acetate-acrylic acid copolymer.

These dispersing agents can be used independently, or two or more thereof can be used at the same time. Specially, the dispersing agent having a carboxyl group on the surface is preferable. In this case, a dissociation constant of the carboxyl group is relatively smaller than that of the other bases. Therefore, after the coloring agent is adhered to the recording material, lowered solubility of the dispersing agent itself or agglomeration of the dispersing agent and the pigment is not caused by lowered pH of the recording ink, interaction of calcium and the like existing in the vicinity of the surface of the recording material with multiple metal ions and the like. In result, even when printing and an image are formed on a recording material having a relatively large size such as plain paper, a sufficient drying rate can be obtained, and strike-through density is little, which is advantageous.

A weight-average molecular weight (Mw) of the dispersing agent is not particularly limited, and can be selected as appropriate according to purposes. The weight-average molecular weight (Mw) of the dispersing agent is, for example, preferably from 3,000 to 50,000, and more preferably from 5,000 to 30,000, and much more preferably from 7,000 to 15,000.

When the weight-average molecular weight (Mw) of the dispersing agent is under 3,000, dispersion stability may not be sufficient. When the weight-average molecular weight (Mw) of the dispersing agent is over 50,000, discharge stability of the recording ink may be lowered by raised viscosity of the dispersing agent itself.

A mass ratio between the coloring agent and the dispersing agent (coloring agent:dispersing agent) is not particularly limited, and can be selected as appropriate according to purposes. For example, the mass ratio between the coloring agent and the dispersing agent is preferably from 1:0.06 to 1:3, and more preferably from 1:0.125 to 1:3.

When the amount of the dispersing agent in the mass ratio is too small, dispersing effect may not be sufficient. Meanwhile, when the amount of the dispersing agent in the mass ratio is too large, viscosity of the recording ink may become high.

Surfactant

The surfactant is not particularly limited, and can be selected as appropriate according to purposes. For example, an ampholytic surfactant, an anion surfactant, a cation surfactant, a nonion surfactant and the like can be cited. These surfactants can be used alone, or two or more thereof can be used at the same time.

Examples of the ampholytic surfactant include alanine, dodecyldi (aminoethyl)glycine, di(octyl aminoethyl)glycine, and N-alkyl-N, N-dimethyl ammonium betaine.

Examples of the anion surfactant include alkyl benzene sulfonate, α-olefin sulfonate, a polyoxy ethylene alkyl ether acetate surfactant, and phosphate ester.

Examples of the cation surfactant include amine salt type surfactants such as alkylamine salt, amino alcohol fatty acid derivative, polyamine fatty acid derivative, and imidazoline; and quaternary ammonium salt type surfactants such as alkyl trimethyl ammonium salt, dialkyl dimethyl ammonium salt, alkyl dimethyl benzil ammonium salt, pyridinium salt, alkyl isoquinolinium salt, and benzethonium chloride.

Examples of the nonion surfactant include a polyoxy ethylene alkyl ether surfactant, a polyoxy ethylene alkyl phenyl ether surfactant, and an acetylene glycol surfactant.

As the surfactant, a fluorine-containing surfactant can be used as well. The fluorine-containing surfactant is not particularly limited, and can be selected as appropriate according to purposes. An anion surfactant having a fluoro alkyl group, a cation surfactant having a fluoro alkyl group and the like are suitable.

Examples of the anion surfactant having a fluoro alkyl group include fluoro alkyl carboxylic acid with carbon number of from 2 to 10 or metallic salts thereof; perfluoro octane sulfonyl glutamic acid disodium, 3-[omega-fluoro alkyl(C6–C11) oxy]-1-alkyl (C3–C4) sodium sulfonate, 3-[omega-fluoro alkanoyl (C6–C8)-N-ethyl amino]-1-propane sulfonic sodium, fluoro alkyl (C11–C20) carboxylic acid or metallic salts thereof; perfluoro alkyl carboxylic acid (C7–C13) or metallic salts thereof; perfluoro alkyl (C4–C12) sulfonic acid or metallic salts thereof; perfluoro octane sulfonic acid diethanol amide, N-propyl-N-(2 hydroxyethyl) perfluoro octane sulfone amide, perfluoro alkyl (C6–C10) sulfone amide propyl trimethyl ammonium salt, perfluoro alkyl (C6–C10)-N-ethyl sulfonyl glycine salt, and monoperfluoroalkyl (C6–C16) ethyl phosphate ester.

As a commercial item of the anion surfactant having a fluoro alkyl group, for example, Surflon S-111, S-112, and S-113 (Asahi Glass Co., Ltd. make), Fluorad FC-93, FC-95, FC-98, and FC-29 (Sumitomo 3M make), Unidyne DS-101 and DS-102 (Daikin Industries, Ltd. make), Megaface F-110, F-120, F-113, F-191, F-812, and F-833 (Dainippon Ink make), Eftop EF-102, 103, 104, 105, 112, 123A, 123B, 306A, 501, 201, and 204 (JEMCO Inc. make), FTERGENT F-100 and F150 (Neos make) can be cited.

Examples of the cation surfactant having a fluoro alkyl group include fatty series primary or secondary amino acid having a fluoro alkyl group, fatty series quaternary ammonium salt such as perfluoro alkyl (C6–C10) sulfone amide propyl trimethyl ammonium salt, benzal conium salt, benzethonium chloride, pyridinium salt, and imidazolinium salt.

As a commercial item of the cation surfactant having a fluoro alkyl group, for example, Surflon S-121 (Asahi Glass Co., Ltd. make), Fluorad FC-135 (Sumitomo 3M make), Unidyne DS-202 (Daikin Industries, Ltd. make), Megaface F-150 and F-824 (Dainippon Ink make), Eftop EF-132 (JEMCO Inc. make), FTERGENT F-300 (Neos make) can be cited.

Among the foregoing surfactants, the anion surfactants and the nonion surfactants are preferable, and the polyoxy ethylene alkyl ether surfactant, and the polyoxy ethylene alkyl ether acetate surfactant are more preferable in terms of storage stability, discharge stability, image quality and the like of the recording ink.

The polyoxy ethylene alkyl ether surfactant is not particularly limited, and can be selected as appropriate according to purposes. For example, the polyoxy ethylene alkyl ether surfactant is preferably selected from compounds expressed by a general formula of $C_nH_{n+1}O(C_mH_{2m}O)_lH$ (where in the general formula, n, m, and l represent integer numbers), which are specifically cited as $C_8H_{17}O(C_2H_4O)_2H$, $C_{10}H_{21}O(C_2H_4O)_4H$, $C_{12}H_{25}O(C_2H_4O)_3H$, $C_{12}H_{25}O(C_2H_4O)_7H$, $C_{12}H_{25}O(C_2H_4O)_{12}H$, $C_{13}H_{27}O(C_2H_4O)_3H$, $C_{13}H_{27}O(C_2H_4O)_5H$, $C_{13}H_{27}O(C_2H_4O)_7H$, $C_{13}H_{27}O(C_2H_4O)_9H$, $C_{13}H_{27}O(C_2H_4O)_{12}H$, $C_{13}H_{27}O(C_2H_4O)_{20}H$, $C_{13}H_{27}O(C_2H_4O)_{30}H$, and $C_{14}H_{29}O(C_2H_4O)_{30}H$.

These compounds can be used alone, or two or more thereof can be used at the same time. The latter case is effective in the case that it is difficult to dissolve a single compound alone in the recording ink, and is advantageous since solubility into the recording ink can be improved. As the polyoxy ethylene alkyl ether surfactant, a commercial item can be used. Examples of the commercial item include BT series (Nikko Chemicals Co., Ltd. make), SOFTANOL series (Nippon Shokubai Co., Ltd. make), and DISPANOL (NOF corporation make).

The polyoxy ethylene alkyl ether acetate surfactant is not particularly limited, and can be selected as appropriate according to purposes. For example, the polyoxy ethylene alkyl ether acetate surfactant is preferably selected from compounds expressed by a general formula of $C_nH_{n+1}O(C_mH_{2m}O)_lCH_2COOH$ (where in the general formula, n, m, and l represent integer numbers), which are specifically cited as $C_8H_{17}O(C_2H_4O)_3CH_2COOH$, $C_{10}H_{21}O(C_2H_4O)_4CH_2COOH$, $C_{12}H_{25}O(C_2H_4O)_3CH_2COOH$, $C_{12}H_{25}O(C_2H_4O)_4CH_2COOH$, $C_{12}H_{25}O(C_2H_4O)_5CH_2COOH$, $C_{12}H_{25}O(C_2H_4O)_{12}CH_2COOH$, $C_{13}H_{27}O(C_2H_4O)_3CH_2COOH$, $C_{13}H_{27}O(C_2H_4O)_5CH_2COOH$, $C_{13}H_{27}O(C_2H_4O)_7CH_2COOH$, $C_{13}H_{27}O(C_2H_4O)_gCH_2COOH$, $C_{13}H_{27}O(C_2H_4O)_{12}CH_2COOH$, $C_{14}H_{29}O(C_2H_4O)_3CH_2COOH$, and $C_{14}H_{29}O(C_2H_4O)_{12}CH_2COOH$.

These compounds can be used alone, or two or more thereof can be used at the same time. The latter case is effective in the case that it is difficult to dissolve a single compound alone in the recording ink, and is advantageous since solubility into the recording ink can be improved. An inorganic salt produced as a by-product in synthesis can be removed by using an ion exchange resin and the like. As the polyoxy ethylene alkyl ether acetate surfactant, a commercial item can be used. Examples of the commercial item include NIKKOL ECT series and NIKKOL AKYPO series (Nikko Chemicals Co., Ltd. make) and BEAULIGHT series (Sanyo Chemical Industries, Ltd. make).

A content of the surfactant in the recording ink is not particularly limited, and can be selected as appropriate according to purposes. For example, the content of the surfactant in the recording ink is preferably from 0.05% by mass to 10% by mass, and more preferably from 0.1% by mass to 5% by mass, and much more preferably from 0.1% by mass to 3% by mass.

When the surfactant is contained in the recording ink, permeability into the recording material (paper or the like) can be improved, and quick drying properties can be obtained. In result, character feathering, color boundary bleeding and the like can be inhibited. When the content of the surfactant is under 0.05% by mass, permeability into the recording paper may not be sufficient. When the content of the surfactant is over 10% by mass, viscosity of the recording ink may be raised, or separation of the surfactant itself may arise at low temperatures.

Penetrant

The penetrant is not particularly limited, and can be selected as appropriate according to purposes. For example, 2,2,4-trimethyl-1,3-pentane diol, 2-ethyl-1,3-hexane diol and the like can be cited. These penetrants can be used alone, or two or more thereof can be used at the same time.

A content of the penetrant in the recording ink is not particularly limited, and can be selected as appropriate according to purposes. The content of the penetrant in the recording ink is, for example, preferably from 0.1% by mass to 5.0% by mass, and more preferably from 2.0% by mass to 4.0% by mass.

When the penetrant is contained in the recording ink, blur can be reduced even in high speed printing. Further, discharge stability and discharge response can be improved. When the content is under 0.1% by mass, quick drying properties cannot be obtained and an image may have blur. When the content is over 5.0% by mass, dispersion stability of the coloring agent is lost, and therefore, clogging of a nozzle and the like may easily arise. In addition, permeability into the recording medium becomes too high more than necessary, and therefore, lowering of an image density, strike-through density and the like may arise.

Defoaming Agent

The defoaming agent is not particularly limited, and can be selected as appropriate according to purposes. For example, a silicone defoaming agent, a polyether defoaming agent, a fatty acid ester defoaming agent are suitable. These defoaming agents can be used alone, or two or more thereof can be used at the same time. Specially, the silicone defoaming agent is preferable since the silicone defoaming agent has superior foam breaking effect.

Examples of the silicone defoaming agent include an oil type silicone defoaming agent, a compound type silicone defoaming agent, a self emulsification silicone defoaming agent, an emulsion silicone defoaming agent, and a denatured silicone defoaming agent. Examples of the denatured silicone defoaming agent include an amino denatured silicone defoaming agent, a carbinol denatured silicone defoaming agent, a methacrylic denatured silicone defoaming agent, a polyether denatured silicone defoaming agent, an alkyl denatured silicone defoaming agent, a higher fatty acid ester denatured silicone defoaming agent, and an alkylene oxide denatured silicone defoaming agent. Specially, the self emulsification silicone defoaming agent and the emulsion silicone defoaming agent and the like are preferable, considering usage for the recording ink which is a water medium.

As the defoaming agent, a commercial item can be used. Examples of the commercial item include silicone defoaming agents of Shin-Etsu Chemical Co., Ltd. Make (KS508, KS531, KM72, KM85 and the like), silicone defoaming agents of Dow Corning Toray Silicone Co., Ltd. make (Q2-3183A, SH5510 and the like), silicone defoaming agents of Nippon Unicar Co., Ltd. Make (SAG 30 and the like), and defoaming agents of Asahi Denka Co., Ltd. make (ADEKANATE series and the like).

A content of the defoaming agent in the recording ink is not particularly limited, and can be selected as appropriate according to purposes. The content of the defoaming agent in the recording ink is, for example, preferably from 0.001% by mass to 3% by mass, and more preferably from 0.05% by mass to 0.5% by mass.

When the defoaming agent is contained in the recording ink, storage stability and discharge stability after elapsed time are particularly superior. When the content of the defoaming agent is under 0.001% by mass, effect of containing the defoaming agent may not be sufficient. When the content of the defoaming agent is over 3% by mass, clogging may be easily caused, and reliability of the recording ink may be lowered.

When a defoaming agent which contains a great amount of inorganic fine particles is used in view of increasing foam breaking effect, the inorganic fine particles are to be removed as appropriate according to need, since it is necessary that in the recording ink using the defoaming agent, $3.0 \times 10^7$ (quantity/5 µl) or less coarse particles having a particle diameter of 0.5 µm or more is contained, and an amount of particles having a particle diameter from 1 µm to under 5 µm in the coarse particles is 1% by number or less.

In the present invention, it is preferable to add a wetting agent to the recording ink in order to secure storage stability and discharge stability of the recording ink. The wetting agent is not particularly limited, and can be selected as appropriate according to purposes. For example, polyvalent alcohol alkyl ether, polyvalent alcohol aryl ether and the like can be cited. These wetting agents can be used alone, or two or more thereof can be used at the same time.

Examples of the polyvalent alcohol alkyl ethers include ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether.

Examples of the polyvalent alcohol aryl ethers include ethylene glycol monophenyl ether and ethylene glycol monobenzil ether.

A content of the wetting agent in the recording ink is not particularly limited, and can be selected as appropriate according to purposes. The content of the wetting agent in the recording ink is preferably from 5% by mass to 40% by mass, and more preferably from 15% by mass to 35% by mass.

When the wetting agent is contained in the recording ink, moisture evaporation from the recording ink is inhibited, separation of the coloring agent at an ink discharge opening of the nozzle, discharge defect due to raised viscosity and the like can be effectively inhibited, and therefore, recording ink having high discharge reliability can be obtained. When the content of the wetting agent is under 5% by mass, effect of usage of the wetting agent may become insufficient. When the content of the wetting agent is over 40% by mass, viscosity of the aqueous recording ink may be raised, which may have an effect on discharge stability.

When the wetting agent is added to the recording ink, the wetting agent and a water-soluble organic solvent can be suitably used at the same time. The water-soluble organic solvent is not particularly limited, and can be selected as appropriate according to purposes. Examples of the water-soluble organic solvent include polyvalent alcohol, a nitrogen-containing heterocyclic compound, amides, amines, a sulfur-containing compounds, propylene carbonate, ethylene carbonate, and γ-butyrolactone. These water-soluble organic solvents can be used alone, or two or more thereof can be used at the same time. The water-soluble organic solvent is preferably used with the wetting agent at the same time in view of inhibiting moisture evaporation from the recording ink.

Examples of the polyvalent alcohol include ethylene glycol, diethylene glycol, triethylene glycol, polyethylene glycol, polypropylene glycol, 1,3 butanediol, 1,5 pentanediol, 1,6 hexanediol, glycerol, 1,2,6-hexane triol, 1,2,4-butane triol, 1,2,3-butane triol, and petriol.

Examples of the nitrogen-containing heterocyclic compound include N-methyl-2-pyrrolidone, N-hydroxyethyl-2-pyrrolidone, 2-pyrrolidone, 1,3-dimethyl imidazolidinone, and ε-caprolactam.

Examples of the amides include formamide, N-methyl formamide, formamide, and N,N-dimethyl formamide.

Examples of the amines include monoethanol amine, diethanol amine, triethanol amine, monoethyl amine, diethyl amine, and triethyl amine.

Examples of the sulfur-containing compounds include dimethyl sulfoxide, sulfolane, and thiodiethanol.

The other components are not particularly limited, and can be selected as necessary. For example, a pH adjuster, a fungicide, an antiseptic agent, an antirust, an antioxidant, an ultraviolet absorbent, an oxygen absorbent, and a light stabilizer can be cited.

The pH adjuster is not particularly limited, and can be selected as appropriate according to purposes. Examples of the pH adjuster include alkalis such as sodium hydroxide, potassium hydroxide, lithium hydroxide, sodium sulfate, acetate, lactate, benzoate, triethanol amine, ammonia, 2-amino-2-methyl-1-propanol (AMP), ammonium phosphate, sodium phosphate, and lithium phosphate; and organic acids or inorganic acids such as acetic acid, hydrochloric acid, nitric acid, sulfuric acid, phosphoric acid, propionic acid, and p-toluene sulfonic acid.

Examples of the fungicide include sodium acetate (JP-A No. 52-12008 and JP-A No. 55-65268), 2-pyridine thiol-1-oxide sodium salt (sodium omadine) (JP-A No. 57-174359), 1,2-benzisothiazoline-3-on (JP-A No. 52-12009), 6-acetoxy-2,4-dimethyl-m-dioxane (JP-A No. 59-215369), sorbic acid soda (JP-A No. 61-179275), isopropyl methyl phenyl, 4-chlor-3,5-dimethyl phenyl (JP-A No. 54-81902), benzoic acid alkali salt, chlorhexidine gluconate, 5-chloro-2-methyl-4-isothiazoline-3-on, and p-oxy benzoic ester. These substances can be used alone, or two or more thereof can be used at the same time.

Examples of the antioxidant include a phenyl antioxidant (including a hindered phenyl antioxidant), an amine antioxidant, a sulfur antioxidant, and a phosphorous antioxidant.

Examples of the phenyl antioxidant include (including the hindered phenyl antioxidant) include butylated hydroxyanisole, 2,6-di-tert-butyl-4-ethylphenyl, stearyl-β-(3,5-di-tert-butyl-4-hydroxyphenyl)propionate, 2,2'-methylenebis (4-methyl-6-tert-butylphenyl), 2,2'-methylenebis (4-ethyl-6-tert-butylphenyl), 4,4'-butylidene bis (3-methyl-6-tert-butylphenyl), 3,9-bis [1,1-dimethyl-2-[β-(3-tert-butyl-4-hydroxy-5-methylphenyl)propionyloxy]ethyl]2,4,8,10-tetra exaspiro [5,5]undecan, 1,1,3-tris(2-methyl-4-hydroxy-5-tert-butylphenyl)butane, 1,3,5-trimethyl-2,4,6-tris(3,5-di-tert-butyl-4-hydroxy benzil)benzene, and tetrakis[methylene-3-3',5'-di-tert-butyl-4'-hydroxyphyenyl)propionate]methane.

Examples of the amine antioxidant include phenyl-β-naphthylamine, α-naphthylamine, N, N'-di-sec-butyl-p-phenylene diamine, phenothiazine, N, N'-diphenyl-p-phenylene diamine, 2,6-di-tert-butyl-p-cresol, 2,6-di-tert-butylphenyl, 2,4-dimethyl-6-tert-butyl-phenyl, butylhydroxy anisol, 2,2'-methylenebis(4-methyl-6-tert-butylphenyl), 4,4'-butylidenebis(3-methyl-6-tert-butylphenyl), 4,4'-thiobis (3-methyl-6-tert-butylphenyl), tetrakis [methylene-3 (3,5-di-tert-butyl-4-dihydroxyphenyl)propionate]methane, and 1,1,3-tris (2-methyl-4-hydroxy-5-tert-butylphenyl)butane.

Examples of the sulfur antioxidant include dilauryl 3,3'-thiodipropionate, distearyl thiodipropionate, lauryl stearyl thiodipropionate, dimyristyl 3,3'-thiodipropionate, distearyl β, β'-thiodipropionate, 2-mercapto benzoimidazole, and dilauryl sulfide.

Examples of the phosphorous antioxidant include triphenyl phosphite, octadecyl phosphite, triisodecyl phosphite, trilauryl trithiophosphite, and trinonylphenyl phosphite.

Examples of the ultraviolet absorbent include a benzophenone ultraviolet absorbent, a benzotriazole ultraviolet absorbent, a salicylate ultraviolet absorbent, a cyanoacrylate ultraviolet absorbent, and a nickel complex salt ultraviolet absorbent.

Examples of the benzophenone ultraviolet absorbent include 2-hydroxy-4-n-octoxy benzophenone, 2-hydroxy-4-n-dodecyl oxybenzophenone, 2,4-dihydroxy benzophenone, 2-hydroxy-4-methoxy benzophenone, and 2,2',4,4'-tetrahydroxy benzophenone.

Examples of the benzotriazole ultraviolet absorbent include 2-(2'-hydroxy-5'-tert-octyl phenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate ultraviolet absorbent include phenyl salicylate, p-tert-butyl phenyl salicylate, and p-octyl phenyl salicylate.

Examples of the cyanoacrylate ultraviolet absorbent include ethyl-2-cyano-3,3'-diphenyl acrylate, methyl-2-ciano-3-methyl-3-(p-methoxyphenyl)acrylate, and butyl-2-cyano-3-methyl-3-(p-methoxyphenyl)acrylate.

Examples of the nickel complex salt ultraviolet absorbent include nickel bis(octyl phenyl)sulfide, 2,2'-thiobis(4-tert-octyl ferrate-n-butyl amine nickel (II), 2,2'-thiobis(4-tert-octyl ferrate)-2-ethyl hexyl amine nickel (II), and 2,2'-thiobis(4-tert-octyl ferrate)triethanolamine nickel (II).

Properties of the recording ink of the present invention are not particularly limited. However, for example, surface tension, viscosity, conductivity, pH and the like are preferably within the following ranges.

The surface tension is preferably from 25 mN/m to 55 mN/m at 20° C. When the surface tension is under 25 mN/m, blur on paper becomes significant, and stable injection cannot be obtained. Meanwhile, when the surface tension is over 55 mN/m, permeation into paper does not sufficiently arise, and drying time may become long.

The viscosity is preferably from 3 mPa·s to 12 mPa·s, and more preferably from 6 mPa·s to 10 mPa·s at 25° C. When the viscosity is under 3 mPa·s, blur on the image may arise. Meanwhile, when the viscosity is over 12 mPa·s, securing discharge stability may become difficult.

The conductivity is preferably 0.5 S/m or less, and more preferably from 0.005 S/m to 0.4 S/m.

The pH is, for example, preferably from 7 to 10.

Coloration of the recording ink of the present invention is not particularly limited, and can be selected as appropriate according to purposes. As the coloration of the recording ink of the present invention, yellow, magenta, cyan, black and the like are cited. When recording is performed by using an ink set using two or more of these colors at the same time, a multicolor image can be formed. When recording is performed by using an ink set using all of these coloration at the same time, a full color image can be formed.

The recording ink of the present invention can be suitably used in various fields. The recording ink of the present invention can be suitably used in an image forming apparatus (for example, printers) with the inkjet recording system. For example, by heating a recording paper and the recording ink at from 50° C. to 200° C. during, before, or after printing, the recording ink of the present invention can be used for a printer having a function to promote printing fixation. In particular, the recording ink of the present invention can be suitably used for the following ink cartridge, ink recorded matter, inkjet recording apparatus, and inkjet recording method of the present invention.

The recording ink of the present invention can be manufactured according to known methods. However, the recording ink of the present invention can be more suitably manufactured by the following manufacturing method of the recording ink of the invention.

(Manufacturing Method of the Recording Ink)

The manufacturing method of the recording ink of the invention includes at least a step of preparing ink liquid and a step of adjusting coarse particles. Further, the manufacturing method of the recording ink of the invention includes other steps selected as appropriate according to need.

The step of preparing ink liquid is a step to prepare an ink liquid by mixing the coloring agent, the surfactant, the penetrant, and the defoaming agent, and further the other components selected as appropriate according to purposes.

Methods and conditions of the mixture are not particularly limited, and can be selected as appropriate according to purposes. The mixture can be performed by using known mixing apparatuses, agitation apparatuses and the like.

The step of adjusting coarse particles is a step to adjust quantity of coarse particles having a particle diameter of 0.5 µm or more to $3.0 \times 10^7$ (quantity/5 µl) or less, and adjust an amount of particles having a particle diameter from 1 µm to under 5 µm in the coarse particles to 1% by number or less by performing at least one of centrifugal separation, ultrafiltration, and filtering for the ink liquid.

The centrifugal separation, ultrafiltration, and filtering can be performed alone, or can be combined with each other. The number of performances can be one time or several times.

The centrifugal separation can be performed by using, for example, a known centrifugal separation apparatus (for example, a high speed centrifugal separator of Kansai Centrifugal Separator Corporation make). Conditions of the centrifugal separation are not particularly limited, and can be selected as appropriate according to purposes. For example, 800 rpm for 15 minutes can be cited as the conditions.

The ultrafiltration is a filtration operation wherein colloidal particles are separated from a dispersion medium by filtration. For example, the ultrafiltration can be suitably performed under an applied pressure by using an ultrafiltration film such as a collodion film, a gelatin film, a cellophane film, and a silic acid film.

The filtering can be suitably performed by using, for example, a membrane filter having an average pore diameter of from 1.2 µm to 5.0 µm.

The recording ink of the present invention can be efficiently manufactured by the above-mentioned manufacturing method of the recording ink of the invention.

(Ink Cartridge)

The ink cartridge of the present invention is an ink cartridge, wherein the recording ink of the present invention is housed in a container, and other members and the like which are selected as appropriate according to need are provided.

The container is not particularly limited. A configuration, a structure, a size, and a material and the like of the container can be selected as appropriate. For example, a container having at least an ink bag and the like made of an aluminum laminated film, a resin film or the like can be cited as a suitable container.

An embodiment of the ink cartridge of the present invention is to be hereinafter described with reference to the drawing. An ink cartridge 1 shown in FIG. 1 has an ink bag 2 which houses recording ink therein and a housing 3 which houses the ink bag 2. The ink bag 2 has a pouched part with plasticity in the shape of about a rectangle made of an aluminum laminated film. The ink bag 2 houses the recording ink of the present invention in the state where the recording ink is filled therein. The housing 3 comprises a first housing 11, a second housing 12, and a third housing 13. In the ink cartridge 1, the first housing 11 and the second housing 12 are fixed by tightening a screw member 82.

The ink cartridge of the present invention houses the recording ink (ink set) of the present invention, and can be used by being removably loaded into various inkjet recording apparatuses. Further, it is particularly preferable that the ink cartridge of the present invention is used by being removably loaded into the after-mentioned inkjet recording apparatus of the present invention.

(Inkjet Recording Apparatus and Inkjet Recording Method)

The inkjet recording apparatus of the present invention has at least a unit for flying ink. The inkjet recording apparatus of the present invention has further other units selected as appropriate according to need, for example, a unit for triggering an impulse, a control unit and the like.

The inkjet recording method of the present invention includes at least a step of flying ink. The inkjet recording method of the present invention further includes other steps selected as appropriate according to need, for example, a step of triggering an impulse, a control step and the like.

The inkjet recording method of the present invention can be suitably performed by the inkjet recording apparatus of the present invention. The step of flying ink can be suitably performed by the unit for flying ink. Further, the other steps can be suitably performed by the other units.

Step of Flying Ink and Unit for Flying Ink

The step of flying ink is a step to form an image by giving an impulse to the recording ink of the present invention and flying the recording ink.

The unit for flying ink is a unit for forming an image by giving an impulse to the recording ink of the present invention and flying the recording ink. The unit for flying ink is not particularly limited. For example, various nozzles for discharging ink can be cited as the unit for flying ink.

The impulse can be triggered by, for example, the unit for triggering an impulse. The impulse is not particularly limited, and can be selected as appropriate according to purposes. For example, heat (temperature), pressure, vibration, and light can be cited as the impulse. These impulses can be used alone, or two or more thereof can be used at the same time. Specially, the heat and the pressure are suitable.

Examples of the unit for triggering an impulse include a heating apparatus, a pressure apparatus, a piezoelectric element, a vibration generator, an ultrasonic generator, and light. Specifically, for example, a piezoelectric actuator such as a piezoelectric element, a thermal actuator which utilizes phase change due to film boiling of liquid by using an electrothermal conversion device such as an exothermic resistor, a memory metal actuator which uses metal phase change due to temperature change, and an electrostatic actuator which uses electrostatic power can be cited.

An embodiment of the flying of the recording ink is not particularly limited, and varies according to types of the impulse and the like. For example, in the case that the impulse is "heat," a method wherein heat energy corresponding to a recording signal is given to the recording ink in a recording head by using a thermal head and the like, air bubbles are generated in the recording ink by the heat energy, and the recording ink is discharged as drops from a nozzle opening of the recording head by a pressure of the air bubbles can be cited. In the case that the impulse is "pressure," for example, a method wherein a piezoelectric element is bent and a capacity of a pressure chamber is reduced by applying a voltage to the piezoelectric element attached to a position called the pressure chamber placed in an ink flow path in the recording head, and the recording ink is discharged as drops from a nozzle opening of the recording head can be cited.

A size of the drop of the recording ink to be flown is, for example, preferably from 3 pl to 40 pl. A rate of the discharge thereof is preferably from 5 m/s to 20 m/s. A drive frequency thereof is preferably 1 kHz or more. A resolution thereof is preferably 300 dpi or more.

The control unit is not particularly limited as long as the control unit is capable of controlling motions of the respective units. The control unit can be selected as appropriate. For example, instruments such as a sequencer and a computer can be cited.

Figure 2:
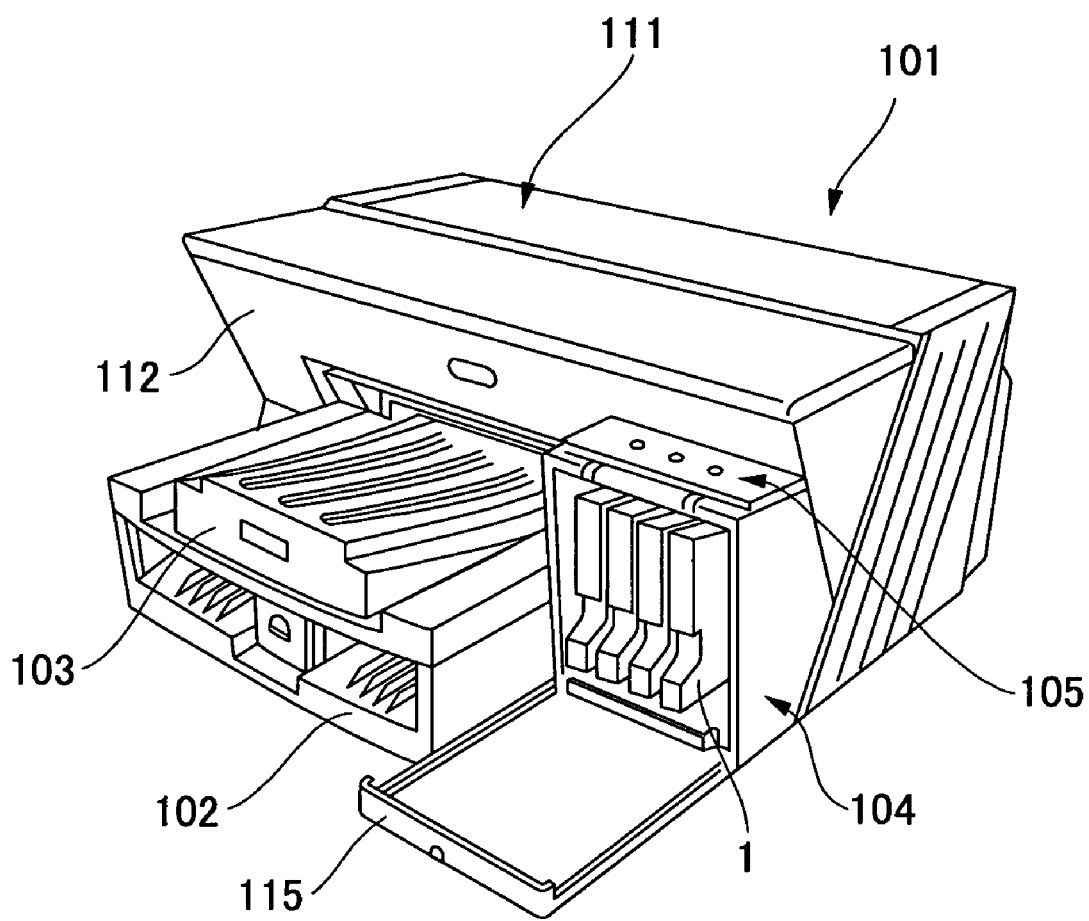
FIG. 2 is an outline explanation drawing showing an example of an inkjet recording apparatus of the present invention.

An embodiment of performing the inkjet recording method of the present invention by the inkjet recording apparatus of the present invention is to be hereinafter described with reference to the drawings. An inkjet recording apparatus shown in FIG. 2 has an apparatus body 101, a paper feed tray 102 to feed paper loaded into the apparatus body 101, a paper ejection tray 103 to stock paper which is loaded into the apparatus body 101 and on which an image is recorded (formed), and an ink cartridge loading part 104. On the top face of the ink cartridge loading part 104, an operation part 105 such as an operation key and an indicator is arranged. The ink cartridge loading part 104 has an openable and closable front cover 115 to remove and load the ink cartridge 1.

Figure 3:
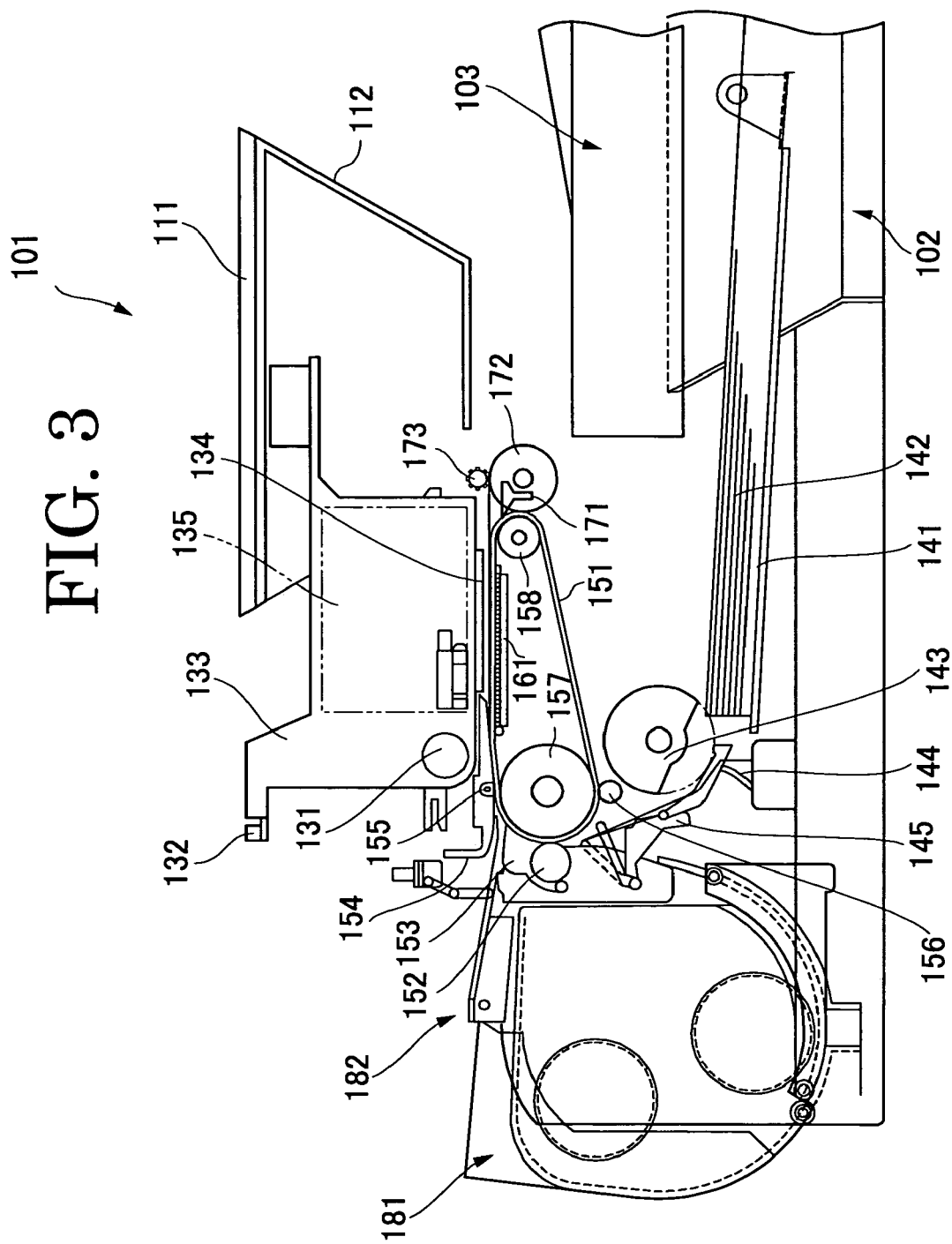
FIG. 3 is an outline explanation drawing showing an example of an internal structure of the inkjet recording apparatus of FIG. 2.
Figure 4:
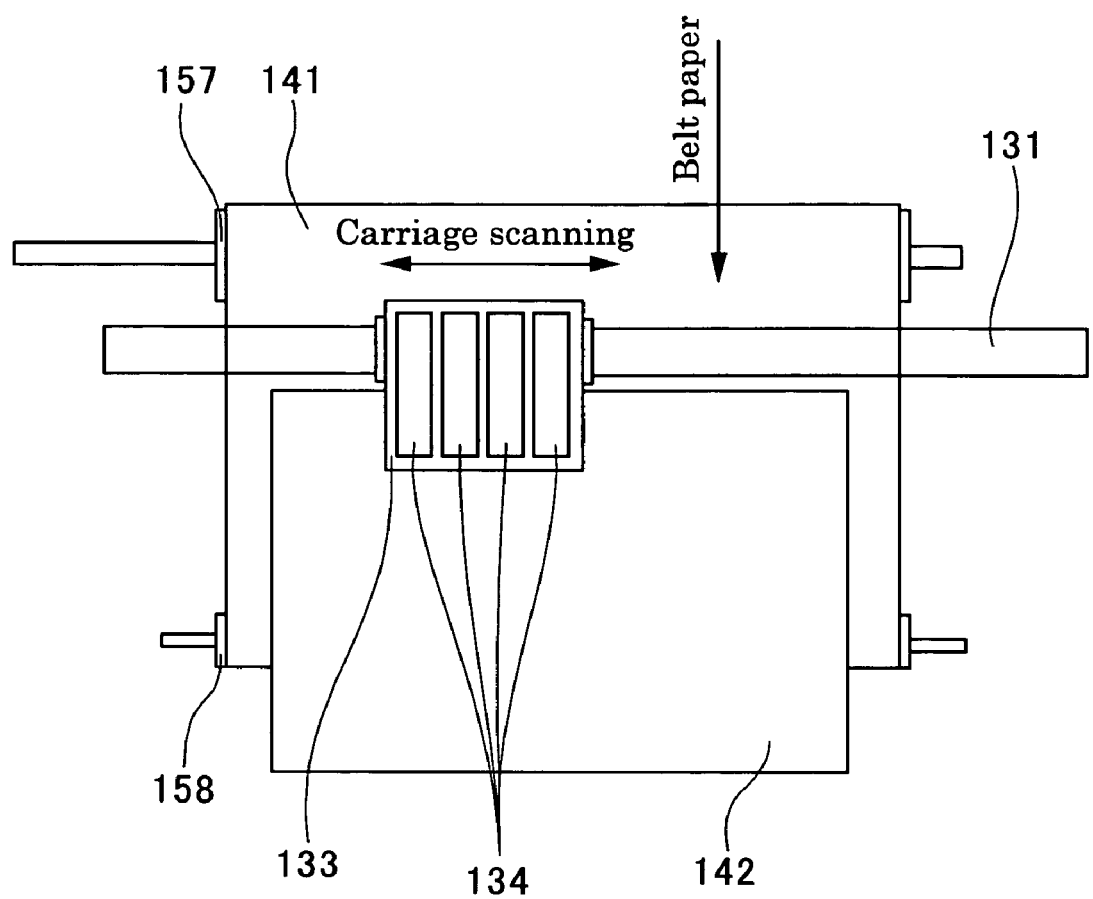
FIG. 4 is an outline plan view showing an internal structure of the inkjet recording apparatus of FIG. 2.

In the apparatus body 101, as shown in FIG. 3 and FIG. 4, a carriage 133 is so held as to slide freely in the main scanning direction by a guide rod 131 and a stay 132, which are guide members laid across on lateral plates (not shown). Scanning is performed by a main scanning motor (not shown) in the arrow directions in FIG. 4.

In the carriage 133, a recording head 134 comprising four inkjet recording heads which discharge recording ink drops for respective colors, yellow (Y), cyan (C), magenta (M), and black (Bk) is loaded, so that a plurality of ink discharge openings are arranged in the direction crossing the main scanning direction, and ink drop discharge direction is headed below.

As an inkjet recording head constructing the recording head 134, an inkjet recording head which comprises a piezoelectric actuator such as a piezoelectric element, a thermal actuator which utilizes phase change due to film boiling of liquid by using an electrothermal conversion device such as an exothermic resistor, a memory metal actuator which uses metal phase change due to temperature change, an electrostatic actuator which uses electrostatic power or the like as a unit for generating energy to discharge the recording ink can be used.

Further, the carriage 133 is provided with a subtank 135 to supply ink for each color to the recording head 134. Through a recording ink supply tube (not shown), the recording ink of the present invention is supplied and refilled to the subtank 135 from the ink cartridge 1 of the present invention which is loaded in the ink cartridge loading part 105.

Meanwhile, as a paper feed part to feed paper 142 loaded on a paper loading part (pressure plate) 141 of the paper feed tray 103, a separation pad 144 and a semilunar roller (paper feed roller 143) are provided. The paper feed roller 143 separately feeds the paper 142 piece by piece from the paper loading part 141. The separation pad 144 faces the semilunar roller (paper feed roller 143) and is made of a material having a large friction coefficient. This separation pad 144 is biased to the paper feed roller 143's side.

As a carrying part to carry, below the recording head 134, the paper 142 fed from this paper feed part, a carrying belt 151 to electrostatically absorb and carry the paper 142, a counter roller 152 to carry the paper 142 fed from the paper feed part through a guide 145 by sandwiching the paper 142 between the counter roller 152 and the carrying belt 151, a carrying guide 153 to change direction of the paper 142 fed substantially vertically upward at an angle of about 90° and let the paper 142 be taken along the carrying belt 151, and an end pressure roller 155 biased to the carrying belt 151's side by a pressure member 154 are provided. Further, an electrification roller 156 which is an electrification unit to charge a surface of the carrying belt 151 is provided.

The carrying belt 151 is an endless belt. The carrying belt 151 is stretched between a carrying roller 157 and a tension roller 158, and can go around in the belt carrying direction. A guide member 161 corresponding to a printing region defined by the recording head 134 is arranged on the rear side of the carrying belt 151. As a paper ejection part to eject the paper 142 recorded by the recording head 134, a separation claw 171 to separate the paper 142 from the carrying belt 151, a paper ejection roller 172, and a paper ejection roller 173 are provided, and the paper ejection tray 103 is arranged below the paper ejection roller 172.

A double-sided paper feed unit 181 is removably loaded on the rear face part of the apparatus body 101. The double-sided paper feed unit 181 takes in the paper 142 returned by backward rotation of the carrying belt 151, inverts the paper 142, and feeds the paper 142 again between the counter roller 152 and the carrying belt 151. A manual paper feed part 182 is provided on the top face of the double-sided paper feed unit 181.

In this inkjet recording apparatus, the paper 142 is separately fed piece by piece from the paper feed part. Then, the paper 142 fed substantially vertically over the paper feed part is guided by the guide 145, and carried by being sandwiched between the carrying belt 151 and the counter roller 152. Further, an end of the paper 142 is guided by the carrying guide 153, and is pressed onto the carrying belt 151 by the end pressure roller 155. Then, carrying direction of the paper 142 is changed at an angle of about 90°.

Then, the carrying belt 157 is charged by the electrification roller 156, and therefore, the paper 142 is carried in the state where the paper 142 is electrostatically absorbed by the carrying belt 151. By driving the recording head 134 corresponding to image signals while moving the carriage 133, ink drops are discharged to the stopped paper 142 and one line is recorded. After the paper 142 is carried in a given amount, the next line is recorded. When a recording finish signal or a signal that a back end of the paper 142 reaches the recording region is received, recording operation is finished, and the paper 142 is ejected to the paper ejection tray 103.

When remaining amount near end of the recording ink inside the subtank 135 is detected, a necessary amount of the recording ink is resupplied from the ink cartridge 1 to the subtank 135.

With this inkjet recording apparatus, when the recording ink in the ink cartridge 1 of the present invention is used up, it is possible to disassemble the housing 3 in the ink cartridge 1 and replace only the interior ink bag 2. Further, the ink cartridge 1 can stably supply the recording ink even when the ink cartridge 1 is placed longitudinally and has a front loading construction. Therefore, even when the installation is made in the state where a space over the top face of the apparatus body 101 is blocked, for example, when the apparatus body 101 is housed in a rack, or objects are laid on the top face of the apparatus body 101, the ink cartridge 1 can be easily replaced.

Here, descriptions have been given of the case that the present invention is applied to a serial type (shuttle type) inkjet recording apparatus in which carriage performs scanning. However, the present invention can be likewise applied to a line type inkjet recording apparatus provided with a line type head.

Further, the inkjet recording apparatus and the inkjet recording method of the present invention can be applied to various recordings by the inkjet recording system. For example, in particular, the inkjet recording apparatus and the inkjet recording method of the present invention can be suitably applied to an inkjet recording printer, a facsimile apparatus, a copy apparatus, a printer/fax/copier complex machine and the like.

(Recorded Matter)

A recorded matter recorded by the inkjet recording apparatus and the inkjet recording method of the present invention is the recorded matter of the present invention. The recorded matter of the present invention has an image formed on a recording material by using the recording ink of the present invention.

The recording material is not particularly limited, and can be selected as appropriate according to purposes. For example, plain paper, glazed paper, special paper, cloths, films, OHP sheets can be cited. These recording materials can be used alone, or two or more thereof can be used at the same time.

The recorded matter has a high image quality, no blur, and superior stability after elapsed time. Therefore, the recorded matter can be suitably used for various purposes as a material or the like on which various printing and images are recorded.

Examples of the present invention are to be hereinafter described. However, the present invention is not limited to the following Examples.

EXAMPLE 1

Preparation of Black Ink

A black pigment as the self dispersion pigment (Toyo Ink make, "KM-9036," average particle diameter: 102 nm) of 50% by mass, glycerin of 10% by mass, 1,3-butanediol of 15% by mass, 2-ethyl-1,3-hexane diol of 2% by mass, 2-pyrrolidone of 2% by mass, a surfactant ($C_{13}H_{27}O(C_2H_4O)_7H$) of 1% by mass, a self emulsification silicone defoaming agent (Shin-Etsu Chemical Co., Ltd. make, "KS508") of 0.1% by mass, and ion exchanged water (remaining amount) were mixed, and the resultant mixture was sufficiently stirred at room temperature. After that, filtration was performed by using a membrane filter having an average pore diameter of 1.2 μm. In result, black ink of Example 1 was prepared.

EXAMPLE 2

Preparation of Yellow Ink

C. I. pigment yellow 97 as the pigment of 30% by mass, polyoxyethylene oleyl ethereal ammonium sulfate of 15% by mass, ethylene glycol of 30% by mass, and purified water (remaining amount) were mixed. After that, dispersion was performed by a wet sand mill, coarse particles were removed by centrifugal separation treatment (for 15 minutes at 800 rpm), and a yellow pigment dispersion liquid (1) having an average particle diameter of 120 nm was prepared.

Next, the yellow pigment dispersion liquid (1) of 20% by mass, glycerin of 5% by mass, diethylene glycol of 15% by mass, 2,2,4-trimethyl-1,3-pentane diol of 2% by mass, Na salt of a surfactant ($C_{13}H_{27}O(C_2H_4O)_5CH_2COOH$) of 1% by mass, a silicone defoaming agent (Shin-Etsu Chemical Co., Ltd. make, "KS531") of 0.1% by mass, and ion exchanged water (remaining amount) were mixed, and the resultant mixture was sufficiently stirred at room temperature. After that, filtration was performed by using a membrane filter having an average pore diameter of 1.2 μm. In result, yellow ink of Example 2 was prepared.

EXAMPLE 3

Preparation of Magenta Ink

C. I. pigment red 122 as the pigment of 30% by mass, polyoxyethylene oleyl ethereal ammonium sulfate of 15% by mass, glycerin of 30% by mass, and purified water (remaining amount) were mixed. After that, dispersion was performed by using a three-roll mill, coarse particles were removed by centrifugal separation treatment (for 15 minutes at 800 rpm), and a magenta pigment dispersion liquid (2) having an average pigment particle diameter of 150 nm was prepared.

Next, the magenta pigment dispersion liquid (2) of 25% by mass, glycerin of 5% by mass, diethylene glycol of 15% by mass, 2,2,4-trimethyl-1,3-pentane diol of 2% by mass, Na salt of a surfactant ($C_{13}H_{27}O(C_2H_4O)_5CH_2COOH$) of 1% by mass, a silicone defoaming agent (Shin-Etsu Chemical Co., Ltd. make, "KS531") of 0.1% by mass, and ion exchanged water (remaining amount) were mixed, and the resultant mixture was sufficiently stirred at room temperature. After that, filtration was performed by using a membrane filter having an average pore diameter of 1.2 μm. In result, magenta ink of Example 3 was prepared.

EXAMPLE 4

Preparation of Cyan Ink

First, C. I. pigment blue 15:3 as the pigment of 30% by mass, polyoxyethylene oleyl ethereal ammonium sulfate of 15% by mass, ethylene glycol of 30% by mass, and purified water (remaining amount) were mixed. After that, dispersion was performed by using a wet sand mill, coarse particles were removed by centrifugal separation treatment (for 15 minutes at 800 rpm), and a cyan pigment dispersion liquid (3) having an average particle diameter of 100 nm was prepared.

Next, the cyan pigment dispersion liquid (3) of 15% by mass, glycerin of 5% by mass, diethylene glycol of 15% by mass, 2,2,4-trimethyl-1,3-pentane diol of 2% by mass, Na salt of a surfactant ($C_{13}H_{27}O(C_2H_4O)_3CH_2COOH$) of 1% by mass, a silicone defoaming agent (Shin-Etsu Chemical Co., Ltd. make, "KS531") of 0.1% by mass, and ion exchanged water (remaining amount) were mixed, and the resultant mixture was sufficiently stirred at room temperature. After that, filtration was performed by using a membrane filter having an average pore diameter of 1.2 μm. In result, cyan ink of Example 4 was prepared.

EXAMPLE 5

Preparation of Cyan Ink

Self dispersion C. I. pigment blue 15:3 as the pigment of 20 parts by mass and sulfolane of 70 parts by mass were fed, and temperature of the resultant was raised up to 120° C. in an oil bath. After that, sulfonation was performed for five hours by adding sulfamic acid of 10 parts by mass, and the resultant was cooled. Coarse particles were removed by centrifugal separation treatment (for 15 minutes at 800 rpm), and a cyan pigment dispersion liquid (4) having an average particle diameter of 110 nm was prepared.

Next, the cyan pigment dispersion liquid (4) of 50% by mass, glycerin of 5% by mass, diethylene glycol of 15% by mass, 2,2,4-trimethyl-1,3-pentane diol of 2% by mass, Na salt of a surfactant ($C_{13}H_{27}O(C_2H_4O)_5CH_2COOH$) of 1% by mass, a silicone defoaming agent (Shin-Etsu Chemical Co., Ltd. make, "KS531") of 0.1% by mass, and ion exchanged water (remaining amount) were mixed, and the resultant mixture was sufficiently stirred at room temperature. After that, filtration was performed by using a membrane filter having an average pore diameter of 1.2 μm. In result, cyan ink of Example 5 was prepared.

EXAMPLE 6

Synthesis of Polymer Solution (A)

Inside of a one-liter flask provided with a mechanical stirrer, a thermometer, a nitrogen gas induction pipe, a reflow pipe, and a dropping funnel is sufficiently substituted with nitrogen gas. After that, styrene of 11.2 g, acrylic acids of 2.8 g, lauryl methacrylate of 12.0 g, polyethylene glycol methacrylate of 4.0 g, a styrene macromer of 4.0 g, and mercapto ethanol of 0.4 g were mixed to prepare a mixed liquid, and a temperature of the mixed liquid was raised up to 65° C. Next, a mixed solution of styrene of 100.8 g, acrylic acids of 25.2 g, lauryl methacrylate of 108.0 g, polyethylene glycol methacrylate of 36.0 g, hydroxyl ethylmethacrylate of 60.0 g, a styrene macromer of 36.0 g, mercaptoethanol of 3.6 g, azobis methyl valeronitrile of 2.4 g, and methyl ethyl ketone of 18 g was dropped in the foregoing mixed liquid in the flask in two and a half hours. After the dropping is finished, a mixed solution of azobis methyl valeronitrile of 0.8 g and methyl ethyl ketone of 18 g was dropped into the flask in half an hour. After maturation for one hour at 65° C., azobis methyl valeronitrile of 0.8 g was added, and the resultant was matured for one hour. After reaction, methyl ethyl ketone of 364 g was added into the flask. In result, a polymer solution (A) having a concentration of 50% by mass of 800 g was synthesized.

Preparation of a Water Dispersing Element of Pigment-Containing Polymer Fine Particles The polymer solution (A) of 28 g, C. I. pigment yellow 97 of 26 g as the pigment, 1 mol/l potassium hydroxide solution of 13.6 g, methyl ethyl ketone of 20 g, and ion exchanged water of 13.6 g were sufficiently stirred, and then, the resultant was kneaded by using a roll mill. The obtained paste was put in ion exchanged water of 200 g, and sufficiently stirred. After that, methyl ethyl ketone and water were removed by using an evaporator. After that, a water dispersing element of yellow polymer fine particles was prepared by centrifugal separation treatment (for 15 minutes at 800 rpm).

An average particle diameter and a solid content of the yellow polymer fine particles in the obtained water dispersing element of yellow polymer fine particles were 80 nm and 20% by mass respectively.

Preparation of Yellow Ink

Next, the water dispersing element of yellow polymer fine particles of 40% by mass, glycerin of 5% by mass, diethylene glycol of 15% by mass, 2,2,4-trimethyl-1,3-pentane diol of 2% by mass, Na salt of a surfactant ($C_{13}H_{27}O(C_2H_4O)_5CH_2COOH$) of 1% by mass, a silicone defoaming agent (Shin-Etsu Chemical Co., Ltd. make, "KS531") of 0.1% by mass, and ion exchanged water (remaining amount) were mixed, and the resultant was sufficiently stirred at room temperature. After that, filtration was performed by using a membrane filter having an average pore diameter of 1.2 μm. In result, yellow ink of Example 6 was prepared.

EXAMPLE 7

Preparation of a Water Dispersing Element of Pigment-containing Polymer Fine Particles A water dispersing element of magenta polymer fine particles was prepared as in Example 6, except that the C. I. pigment yellow 97 as the pigment in Example 6 was changed to C. I. pigment red 122. An average particle diameter and a solid content of the magenta polymer fine particles in the obtained water dispersing element of magenta polymer fine particles were 150 nm and 20% by mass respectively.

Preparation of Magenta Ink

The water dispersing element of magenta polymer fine particles of 50% by mass, glycerin of 5% by mass, diethylene glycol of 15% by mass, 2,2,4-trimethyl-1,3-pentane diol of 2% by mass, Na salt of a surfactant ($C_{13}H_{27}O(C_2H_4O)_5CH_2COOH$) of 1% by mass, a silicone defoaming agent (Shin-Etsu Chemical Co., Ltd. make, "KS531") of 0.1% by mass, and ion exchanged water (remaining amount) were mixed, and the resultant mixture was sufficiently stirred at room temperature. After that, filtration was performed by using a membrane filter having an average pore diameter of 1.2 μm. In result, magenta ink of Example 7 was prepared.

EXAMPLE 8

Preparation of a Water Dispersing Element of Pigment-containing Polymer Fine Particles A water dispersing element of cyan polymer fine particles was prepared as in Example 6, except that the C. I. pigment yellow 97 as the pigment in Example 6 was changed to C. I. pigment blue 15:3.

An average particle diameter and a solid content of the cyan polymer fine particles in the obtained water dispersing element of cyan polymer fine particles were 115 nm and 20% by mass respectively.

Preparation of Cyan Ink

The water dispersing element of cyan polymer fine particles of 40% by mass, glycerin of 5% by mass, diethylene glycol of 15% by mass, 2,2,4-trimethyl-1,3-pentane diol of 2% by mass, Na salt of a surfactant ($C_{13}H_{27}O(C_2H_4O)_3CH_2COOH$) of 1% by mass, a silicone defoaming agent (Shin-Etsu Chemical Co., Ltd. make, "KS531") of 0.1% by mass, and ion exchanged water (remaining amount) were mixed, and the resultant mixture was sufficiently stirred at room temperature. After that, filtration was performed by using a membrane filter having an average pore diameter of 1.2 μm. In result, cyan ink of Example 8 was prepared.

COMPARATIVE EXAMPLE 1

Preparation of Black Ink

CAB-O-JET 200 as the coloring agent (sulfone group-adding type pigment, average particle diameter: 130 nm, Cabot make) of 50% by mass, glycerin of 10% by mass, diethylene glycol of 30% by mass, 2-ethyl-1,3-hexane diol of 2% by mass, Na salt of a surfactant ($C_{13}H_{27}O(C_2H_4O)_3CH_2COOH$) of 1% by mass, a silicone defoaming agent (Nippon Unicar Co., Ltd. make, "SAG30" (emulsion)) of 0.03% by mass, and ion exchanged water (remaining amount) were mixed, and the resultant mixture was sufficiently stirred at room temperature. After that, filtration was performed by using a membrane filter having an average pore diameter of 1.2 μm. In result, black ink of Comparative example 1 was prepared.

COMPARATIVE EXAMPLE 2

Preparation of Yellow Ink

Yellow ink of Comparative example 2 was prepared as in Example 2, except that the centrifugal separation treatment in Example 2 was not performed. An average particle diameter of a pigment in a yellow pigment dispersion liquid of Comparative example 2 was 180 nm.

COMPARATIVE EXAMPLE 3

Preparation of Magenta Ink

Magenta ink of Comparative example 3 was prepared as in Example 3, except that the centrifugal separation treatment in Example 3 was not performed. An average particle diameter of a pigment in a magenta pigment dispersion liquid of Comparative example 3 was 220 nm.

COMPARATIVE EXAMPLE 4

Preparation of Cyan Ink

Cyan ink of Comparative example 4 was prepared as in Example 4, except that the centrifugal separation treatment in Example 4 was not performed. An average particle diameter of a pigment in a cyan pigment dispersion liquid of Comparative example 4 was 165 nm.

COMPARATIVE EXAMPLE 5

Preparation of Cyan Ink

Cyan ink of Comparative example 5 was prepared as in Example 5, except that the centrifugal separation treatment in Example 5 was not performed. An average particle diameter of a pigment in a cyan pigment dispersion liquid of Comparative example 5 was 185 nm.

Regarding the obtained recording inks of Example 1 to Example 8 and Comparative example 1 to Comparative example 5, evaluation was made as follows. Results are shown in Table 1.

<Measurement of Coarse Particle Quantity in the Recording Ink>

The quantity (number) of coarse particles each having a particle diameter of 0.5 μm or more in the recording inks of 511 was measured by AccuSizer 780 (Particle Sizing Systems make). Further, from the measurement data, particle quantities of particles having a particle diameter of from 0.5 μm to under 1 μm, particles having a particle diameter of from 1 μm to under 5 μm, and particles having a particle diameter of 5 μm or more were calculated, and a proportion thereof to gross coarse particle quantities was calculated.

<Discharge Stability (Intermittent Discharge Stability)>

Intermittent discharge stability was evaluated by using the recording ink fabricated in Examples and Comparative examples.

As an evaluation machine, Inkjet (IJ) Printer IPSiO Jet 300 (Ricoh Co., Ltd.) was used. In the state where discharge was not performed for a certain time, a carriage performed scanning (empty scanning). After that, respective 20 drops of all the nozzles were printed on coated paper for IJ. After that, recovery operation (purge: 50 drops) was performed. Evaluation was repeated ten times. The empty scanning time includes four steps, that is, 5 sec, 15 sec, 30 sec, and 60 sec. Among the printing of the 20 drops, macro photographs of dot injection directions of the first drop were taken, and evaluation was made visually based on the following standards.

[Judgemental Standards for Evaluating Dot Injection Directions of the First Drop]

A: A state in which no injection directions are disordered and nozzles are arranged substantially on one line B: A state in which injection directions are slightly disordered, but such directions do not interfere with a line of the second shot C: A state in which a dot of the first shot is beyond a line of a dot of the second shot D: A state in which no injection is shown

TABLE 1

| Ink type | Evaluation 1 | | Evaluation 2 |
|---|---|---|---|
| | Coarse particle quantity | % | |
| Example 1 | 4.5 × 10$^5$ | 0.02 | A |
| Example 2 | 3.5 × 10$^6$ | 0.75 | A |
| Example 3 | 2.5 × 10$^6$ | 0.34 | A |
| Example 4 | 1.2 × 10$^7$ | 0.20 | A |
| Example 5 | 7.5 × 10$^6$ | 0.11 | A |
| Example 6 | 2.4 × 10$^6$ | 0.63 | A |
| Example 7 | 1.1 × 10$^6$ | 0.82 | A |
| Example 8 | 4.0 × 10$^6$ | 0.41 | A |
| Comparative example 1 | 1.5 × 10$^6$ | 1.60 | B |
| Comparative example 2 | 3.5 × 10$^7$ | 1.20 | C |
| Comparative example 3 | 8.0 × 10$^6$ | 2.20 | B |
| Comparative example 4 | 1.0 × 10$^8$ | 2.60 | D |
| Comparative example 5 | 2.0 × 10$^7$ | 1.50 | C |

From the results of Table 1, it is found that discharge stability is high when particle quantity of the coarse particles having a particle diameter of 0.5 μm or more in the ink of 5 μl is 3.0×10$^7$ or less, and a proportion of particle quantity of the particles having a particle diameter from 1 μm to under 5 μm relative to the coarse particle quantity is 1% or less.

EXAMPLE 9

Preparation of Cyan Ink

Cyan ink of Example 9 was prepared as in Example 5, except that an average pore diameter of the membrane filter was changed from 1.2 μm of Example 5 to 5.0 μm.

COMPARATIVE EXAMPLE 6

Preparation of Cyan Ink

Cyan ink of Comparative example 6 was prepared as in Comparative example 5, except that an average pore diameter of the membrane filter was changed from 1.2 μm of Comparative example 5 to 5.0 μm.

Regarding the respective recording inks of Example 5 and Example 9 and the respective recording inks of Comparative example 5 and Comparative example 6, evaluation similar in the foregoing evaluation was made before and after leaving the respective recording inks for 30 days at 50° C. Results are shown in Table 2.

TABLE 2

|  | Before storage | | | After storage | | |
|---|---|---|---|---|---|---|
|  | Evaluation 1 | | | Evaluation 1 | | |
| Ink type | Coarse particle quantity | % | Evaluation 2 | Coarse particle quantity | % | Evaluation 2 |
| Example 5 | $7.5 \times 10^6$ | 0.11 | A | $8.2 \times 10^6$ | 0.20 | A |
| Example 6 | $9.4 \times 10^6$ | 0.42 | A | $1.3 \times 10^7$ | 0.88 | B |
| Comparative example 5 | $2.0 \times 10^7$ | 1.50 | C | $6.0 \times 10^7$ | 1.72 | D |
| Comparative example 6 | $1.0 \times 10^7$ | 1.20 | B | $1.8 \times 10^7$ | 3.50 | D |

From the results of Table 2, it is found that when particle quantity of the coarse particles having a particle diameter of 0.5 μm or more in the ink of 5 μl is $3.0 \times 10^7$ or less, and a proportion of particle quantity of the particles having a particle diameter from 1 μm to under 5 μm relative to the coarse particle quantity is 1% or more as in Comparative example 5 and Comparative example 6, discharge stability becomes deteriorated, in particular, becomes significantly deteriorated after long-term storage, and storage stability becomes inferior compared to in Example 5 and Example 9.

EXAMPLE 10

Preparation of an Ink Set

An ink set of Example 10 comprising the respective recording inks of Examples 1 to Example 4 was prepared.

COMPARATIVE EXAMPLE 7

Preparation of an Ink Set

An ink set of Comparative example 7 was prepared as in Example 10, except that the surfactant and the penetrant (2-ethyl-1,3-hexane diol or 2,2,4-trimethyl-1,3-pentane diol) were omitted from the respective recording inks of Example 1 to Example 4.

COMPARATIVE EXAMPLE 8

Preparation of Ink Set

An ink set of Comparative example 8 was prepared as in Example 10, except that the penetrant (2-ethyl-1,3-hexane diol or 2,2,4-trimethyl-1,3-pentane diol) were omitted from the respective recording inks of Example 1 to Example 4.

EXAMPLE 11

Preparation of an Ink Set

An ink set of Example 11 comprising the respective recording inks of Example 1, Example 6, Example 7, and Example 8 was prepared.

EXAMPLE 12

Preparation of an Ink Set

An ink set of Example 12 was fabricated as in Example 11, except that the surfactant for the respective recording inks of Example 1, Example 6, Example 7, and Example 8 was changed to a fluorine-containing surfactant (FT-110 (Neos make)).

Regarding the obtained respective ink sets of Example 10 to Example 12 and Comparative example 7 to Comparative example 8, evaluation was made as follows. Results are shown in Table 3.

<Evaluation of Image Quality (Color Boundary Bleeding)>

The Inkjet (IJ) Printer IPSiO Jet 300 (Ricoh Co., Ltd.) was used. As evaluation paper, plain paper was used. A character image was printed, and character feathering and color boundary bleeding thereof were evaluated based on the following standards.

[Evaluation Standards]
A: A state in which no blur is shown
B: A state in which blur is hardly shown
C: A state in which blur is slightly shown
D: A state in which blur is clearly shown

TABLE 3

|  | Character feathering | Color boundary bleeding |
|---|---|---|
| Ink set of Example 10 | A | A |
| Ink set of Example 11 | A | A |
| Ink set of Example 12 | B | B |
| Ink set of Comparative example 7 | C | D |
| Ink set of Comparative example 8 | B | C |

From the results of Table 3, it was found that when the ink sets of 7 and Comparative example 8 which did not contain at least one of the surfactant and the penetrant were used, permeability into the paper was bad and blur easily arise even in a high density, and image quality was deteriorated due to blur particularly in high speed printing.

Meanwhile, it was found that when the ink sets of Example 10 to Example 12, in particular, when the ink sets of Example 10 and Example 11 were used, character feathering and color boundary bleeding did not arise, and high image quality could be obtained.

Next, the respective recording inks of Example 4, Example 5, and Example 8 and the cyan ink of the ink set of Example 12 were evaluated as follows. Results are shown in Table 4.

<Discharge Stability Evaluation (Continuous Discharge Stability)>

Solid images were continuously printed by using the Inkjet (IJ) Printer IPSiO Jet 300 (Ricoh Co., Ltd.), and time (sec) until discharge defect arose was measured.

TABLE 4

|  | Time (s) |
|---|---|
| Example 4 | 600 |
| Example 5 | 900 |
| Example 8 | 500 |
| Cyan ink of Example 12 | 200 |

From the results of Table 4, it was found that the ink containing the self dispersion pigment of Example 5 showed the highest discharge stability. Further, there was a tendency that the ink sets of Example 4, Example 5, and Example 8 showed more superior discharge stability than the ink set of Example 12 in which the fluorine-containing surfactant was added.

COMPARATIVE EXAMPLE 9

Preparation of an Ink Set

An ink set of Comparative example 9 was prepared as in Example 10, except that the defoaming agent was omitted from the respective recording inks of Example 1 to Example 4.

The ink set of Example 10 and the ink set of Comparative example 9 were evaluated as follows. Results are shown in Table 5.

<Initial Filling Properties in Loading a Cartridge>

The respective recording inks were deaerated, and filled into the cartridge. After the cartridge was loaded in the Inkjet (IJ) Printer IPSiO Jet 300 (Ricoh Co., Ltd.), initial filling operation was performed. After that, a nozzle check pattern was printed. Then, initial filling properties were evaluated by the number of initial filling operations performed until nozzle dropout did not arise, based on the following standards.

[Evaluation Standards]

A: Filling was completed by one operation.

B: Filling was completed by two or more operations.

<Number of Recovery Operations During Printing, and Recording Ink Amount Consumed>

Solid images were formed for each color by using the Inkjet (IJ) Printer IPSiO Jet 300 (Ricoh Co., Ltd.) in which the respective recording inks were filled. When nozzle dropout arose, recovery operation was performed. Printing was performed for each color on 20 pieces of A4 size paper in total. Cartridge mass before and after printing was measured, an amount of recording ink consumed was calculated, and the number of recovery operations performed during printing was checked.

TABLE 5

| | Evaluation 5 | Evaluation 6 | |
|---|---|---|---|
| | Number of operations | Number of operations | Ink amount consumed (g) |
| Ink set of Example 10 | | | |
| Black ink | A | 3 | 13.5 |
| Yellow ink | A | 2 | 13 |
| Magenta ink | A | 2 | 13 |
| Cyan ink | A | 1 | 12.5 |
| Ink set of Comparative example 9 | | | |
| Black ink | B | 6 | 15 |
| Yellow ink | B | 5 | 14.5 |
| Magenta ink | B | 8 | 16 |
| Cyan ink | B | 7 | 15.5 |

From the results of Table 5, it was found that in the ink set of Comparative example 9 in which the defoaming agent was not added, the initial filling properties were poor and the discharge defect was increased since air bubbles were easily sucked, compared to in the ink set of Comparative example 10.

EXAMPLE 13

Preparation of Recording Ink

Recording ink of Example 13 was prepared as in Example 1, except that KS508 (Shin-Etsu Chemical Co., Ltd. make) as a self emulsification silicone defoaming agent in Example 1 was changed to KM72F (Shin-Etsu Chemical Co., Ltd. make) as an emulsion silicone defoaming agent.

COMPARATIVE EXAMPLE 10

Preparation of Recording Ink

Recording ink of Comparative example 10 was prepared as in Example 1, except that KS508 (Shin-Etsu Chemical Co., Ltd. make) as a self emulsification silicone defoaming agent in Example 1 was changed to a non-silicone defoaming agent (polyether defoaming agent, Asahi Denka Co., Ltd. make, "LG294").

The obtained recording inks of Example 1 and Example 13 and Comparative example 10 were evaluated as follows. Results are shown in Table 6.

<Stability after Elapsed Time>

The respective recording inks were stored for ten days in an environment of 50° C. Foaming power of the recording ink before and after storage was observed in an environment of 25° C. based on JIS K3362, and evaluated based on the following standards.

[Evaluation Standards]

A: A state in which no difference of foaming power was shown between before storage and after storage B: A state in which lowering of foaming power after storage was under 30% before storage C: A state in which lowering of foaming power after storage was from 30% to under 50% before storage D: A state in which lowering of foaming power after storage was 50% or more before storage

TABLE 6

| | Stability after elapsed time |
|---|---|
| Example 1 | A |
| Example 13 | B |
| Comparative example 10 | D |

From the results of Table 6, it was found that the self emulsification silicone defoaming agent of Example 1 and the emulsion silicone defoaming agent of Example 13 had superior stability after elapsed time.

According to the present invention, various conventional problems can be solved. Further, the present invention can provide recording ink, which has superior storage stability, in which discharge stability, particularly discharge stability during continuous discharge or after stopping discharge is improved, and with which a high image quality with less blur can be obtained. Moreover, the present invention can provide a manufacturing method of the recording ink, an ink cartridge, an ink recorded matter, an inkjet recording apparatus, and an inkjet recording method using the ink.

What is claimed is:

1. A recording ink, comprising:
   a coloring agent comprising a pigment;
   a surfactant;
   a penetrant; and
   a silicone defoaming agent,
   wherein the recording ink comprises $3.0 \times 10^7$ (quantity/5 µl) or less coarse particles each having a particle diameter of 0.5 µm or more, and an amount of a particle having a particle diameter of from 1 µm to under 5 µm in the coarse particles is 1% by number or less.

2. The recording ink according to claim 1, wherein the pigment comprises at least one kind of a hydrophilic group and shows at least one of a water dispersibility and a water solubility in an absence of a dispersing agent.

3. The recording ink according to claim 1, wherein the pigment has at least one of a water dispersibility and a water solubility under an existence of a dispersing agent.

4. The recording ink according to claim 1, wherein an average particle diameter of the pigment is from 10 nm to 200 nm.

5. The recording ink according to claim 1, wherein the surfactant is at least one selected from the group consisting of a polyoxy ethylene alkyl ether surfactant and a polyoxy ethylene alkyl ether acetate surfactant.

6. The recording ink according to claim 5, wherein
the polyoxy ethylene alkyl ether surfactant is selected from the group consisting of $C_8H_{17}O(C_2H_4O)_2H$, $C_{10}H_{21}O(CH_4O)_4H$, $C_{12}H_{25}O(C_2H_4O)_3H$, $C_{12}H_{25}O(C_2H_4O)_7H$, $C_{12}H_{25}O(C_2H_4O)_{12}H$, $C_{13}H_{27}O(C_2H_4O)_3H$, $C_{13}H_{27}O(C_2H_4O)_5H$, $C_{13}H_{27}O(C_2H_4O)_7H$, $C_{13}H_{27}O(C_2H_4O)_9H$, $C_{13}H_{27}O(C_2H_4O)_{12}H$, $C_{13}H_{27}O(C_2H_4O)_{20}H$, $C_{13}H_{27}O(C_2H_4O)_{30}H$, and $C_{14}H_{29}O(C_2H_4O)_{30}H$, and
the polyoxy ethylene alkyl ether acetate surfactant is selected from the group consisting of $C_8H_{17}O(C_2H_4O)_3CH_2COOH$, $C_{10}H_{21}O(C_2H_4O)_4CH_2COOH$, $C_{12}H_{25}O(C_2H_4O)_3CH_2COOH$, $C_{12}H_{25}O(C_2H_4O)_4CH_2COOH$, $C_{12}H_{25}O(C_2H_4O)_5CH_2COOH$, $C_{12}H_{25}O(C_2H_4O)_{12}CH_2COOH$, $C_{13}H_{27}O(C_2H_4O)_3CH_2COOH$, $C_{13}H_{27}O(C_2H_4O)_5CH_2COOH$, $C_{13}H_{27}O(C_2H_4O)_7CH_2COOH$, $C_{13}H_{27}O(C_2H_4O)_9CH_2COOH$, $C_{13}H_{27}O(C_2H_4O)_{12}CH_2COOH$, $C_{14}H_{29}O(C_2H_4O)_3CH_2COOH$, and $C_{14}H_{29}O(C_2H_4O)_{12}CH_2COOH$.

7. The recording ink according to claim 1, wherein the penetrant is at least one selected from the group consisting of a 2,2,4-trimethyl-1,3-pentane diol and a 2-ethyl-1,3-hexane diol.

8. The recording ink according to claim 1, wherein the silicone defoaming agent is one of a self emulsification silicone defoaming agent and an emulsion silicone defoaming agent.

9. The recording ink according to claim 1, wherein the recording ink comprises a wetting agent.

10. The recording ink according to claim 1, wherein the recording ink comprises a water soluble organic solvent.

11. The recording ink according to claim 1, wherein a growth rate of the coarse particles after being left for 30 days at 500° C. is 50% by number or less.

12. The recording ink according to claim 1, wherein the recording ink is selected from the group consisting of a cyan ink, a magenta ink a yellow ink, and a black ink.

13. The recording ink according to claim 1, wherein an amount of particles having a particle diameter from 1 μm to under 5 μm is 0.005% by number to 1% by number.

14. A method of manufacturing a recording ink, comprising:
preparing an ink liquid by mixing a coloring agent comprising a pigment, a surfactant, a penetrant, and a silicone defoaming agent; and
adjusting a coarse particle in which at least one of a centrifugal separation, an ultrafiltration, and a filtering is performed for the ink liquid, so that the coarse particle having a particle diameter of 0.5 μm or more is contained by $3.0 \times 10^7$ (quantity/5 μl) or less in number, and an amount of a particle having a particle diameter of from 1 μm to under 5 μm in the coarse particle is 1% by number or less.

15. An ink cartridge, comprising:
a container which houses therein a recording ink which comprises:
a coloring agent comprising a pigment;
a surfactant;
a penetrant; and
a silicone defoaming agent,
wherein the recording ink comprises $3.0 \times 10^7$ (quantity/5 μl) or less coarse particles each having a particle diameter of 0.5 μm or more, and an amount of a particle having a particle diameter of from 1 μm to under 5 μm in the coarse particles is 1% by number or less.

16. An inkjet recording apparatus, comprising:
an ink flying unit which forms an image by giving an impulse to a recording ink to thereby fly the recording ink which comprises:
a coloring agent comprising a pigment;
a surfactant;
a penetrant; and
a silicone defoaming agent,
wherein the recording ink comprises $3.0 \times 10^7$ (quantity/5 μl) or less coarse particles each having a particle diameter of 0.5 μm or more, and an amount of a particle having a particle diameter of from 1 μm to under 5 μm in the coarse particles is 1% by number or less.

17. The inkjet recording apparatus according to claim 16, wherein the impulse is at least one selected from the group consisting of a heat, a temperature, a pressure, a vibration, and a light.

18. An inkjet recording method, comprising:
forming an image by giving an impulse to a recording ink to thereby fly the recording ink which comprises:
a coloring agent comprising a pigment;
a surfactant;
a penetrant; and
a silicone defoaming agent,
wherein the recording ink comprises $3.0 \times 10^7$ (quantity/5 μl) or less coarse particles each having a particle diameter of 0.5 μm or more, and an amount of a particle having a particle diameter of from 1 μm to under 5 μm in the coarse particles is 1% by number or less.

19. The inkjet recording method according to claim 18, wherein the impulse is at least one selected from the group consisting of a heat, a temperature, a pressure, a vibration, and a light.

20. An inkjet recorded matter, comprising:
an image which is formed by using a recording ink which comprises:
a coloring agent comprising a pigment;
a surfactant;
a penetrant; and
a silicone defoaming agent,
wherein the recording ink comprises $3.0 \times 10^7$ (quantity/5 μl) or less coarse particles each having a particle diameter of 0.5 μm or more, and an amount of a particle having a particle diameter of from 1 μm to under 5 μm in the coarse particles is 1% by number or less.

* * * * *